US012399595B2

United States Patent
Kim et al.

(10) Patent No.: US 12,399,595 B2
(45) Date of Patent: Aug. 26, 2025

(54) ELECTRONIC DEVICE AND INTERFACE DEVICE INCLUDING THE SAME

(71) Applicant: SAMSUNG DISPLAY CO., LTD., Yongin-si (KR)

(72) Inventors: Miyoung Kim, Yongin-si (KR); Kyowon Ku, Yongin-si (KR); Gwang-Bum Ko, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/767,405

(22) Filed: Jul. 9, 2024

(65) Prior Publication Data

US 2025/0036245 A1    Jan. 30, 2025

(30) Foreign Application Priority Data

Jul. 27, 2023    (KR) ........................ 10-2023-0098350

(51) Int. Cl.
*G06F 3/044* (2006.01)
*G06F 1/16* (2006.01)
*G06F 3/0354* (2013.01)
*G06F 3/041* (2006.01)

(52) U.S. Cl.
CPC .......... *G06F 3/0446* (2019.05); *G06F 1/1652* (2013.01); *G06F 3/03545* (2013.01); *G06F 3/0412* (2013.01); *G06F 3/0443* (2019.05)

(58) Field of Classification Search
CPC .. G06F 3/0446; G06F 3/0443; G06F 3/03545; G06F 3/0412; G06F 1/1652
See application file for complete search history.

(56) References Cited

U.S. PATENT DOCUMENTS

| | | | |
|---|---|---|---|
| 9,158,398 B2 | 10/2015 | Jeong et al. | |
| 11,132,020 B2 | 9/2021 | Kim et al. | |
| 11,775,101 B2 | 10/2023 | Kang et al. | |
| 12,153,764 B1* | 11/2024 | Smith | G06F 3/0441 |
| 2023/0409142 A1* | 12/2023 | Lim | G06F 3/0441 |
| 2024/0248571 A1* | 7/2024 | Kim | G06F 3/04164 |

FOREIGN PATENT DOCUMENTS

| | | |
|---|---|---|
| KR | 10-1391243 B1 | 5/2014 |
| KR | 10-2019-0120906 A | 10/2019 |
| KR | 10-2020-0122688 A | 10/2020 |
| KR | 10-2022-0158985 A | 12/2022 |

* cited by examiner

*Primary Examiner* — Peter D McLoone
(74) *Attorney, Agent, or Firm* — F. CHAU & ASSOCIATES, LLC

(57) ABSTRACT

An interface device includes an electronic device and an input device. The electronic device includes a display layer that includes a display area that includes a foldable area and non-foldable areas, a sensor layer that includes a plurality of detection electrodes, and a sensor driving unit that drives the sensor layer. The plurality of detection electrodes include a first pen sensing electrode and a second pen sensing electrode, and the sensor driving unit transmits to the first pen sensing electrode one of a first sensing signal that has a first driving frequency or a second sensing signal that has a second driving frequency that differs from the first driving frequency according to a position of the input device with respect to the display area.

25 Claims, 17 Drawing Sheets

ELECTRONIC DEVICE AND INTERFACE DEVICE INCLUDING THE SAME

CROSS-REFERENCE TO RELATED APPLICATIONS

This application claims priority under 35 U.S.C. § 119 from Korean Patent Application No. 10-2023-0098350, filed on Jul. 27, 2023 in the Korean Intellectual Property Office, the contents of which are herein incorporated by reference in their entirety.

TECHNICAL FIELD

Embodiments of the present disclosure described herein are directed to an electronic device that has increased sensing accuracy, and an interface device that includes the same.

DISCUSSION OF THE RELATED ART

Electronic devices, such as smart phones, digital cameras, laptop computers, navigation devices, and smart televisions, that provide images to users include electronic devices that display the images. The electronic devices generate images and provide the images to users through display areas.

The electronic device includes a display layer that displays an image, a sensor layer that is disposed on the display layer and detects a touch of a user, and a digitizer that is disposed under the display layer and detects a touch of a pen. The digitizer may be implemented in an electromagnetic manner or an electromagnetic resonance manner.

The digitizer includes a plurality of coils. When a user moves the pen on the display device, the pen is driven by an alternating current (AC) signal that generates an oscillating magnetic field, and the oscillating magnetic field induces a signal in the coils. A position of the pen is detected through the signal induced in the coil. The digitizer determines the position of the pen by detecting an electromagnetic change occurring as the pen approaches.

Two input devices, such as the sensor layer and the digitizer, are used separately and increase a thickness of the display device. A technology for reducing the thickness of the display device is desirable.

SUMMARY

Embodiments of the present disclosure provide an electronic device that has increased sensing accuracy and an interface device that includes the same.

According to an embodiment, an interface device includes an electronic device and an input device that communicates with the electronic device, the electronic device includes a display layer that includes a display area that includes a foldable area and a plurality of non-foldable areas spaced apart from each other with the foldable area interposed therebetween, a sensor layer disposed on the display layer and that includes a plurality of detection electrodes, and a sensor driving unit that drives the sensor layer. The plurality of detection electrodes include a first sensing electrode, a second sensing electrode that is insulated from and crosses the first sensing electrode, a first pen sensing electrode that is adjacent to the first sensing electrode and is insulated from and crosses the second sensing electrode, and a second pen sensing electrode that is adjacent to the second sensing electrode and is insulated from and crosses the first sensing electrode and the first pen sensing electrode. The sensor driving unit transmits to the first pen sensing electrode one of a first sensing signal that has a first driving frequency or a second sensing signal that has a second driving frequency that differs from the first driving frequency according to a position of the input device with respect to the display area.

The sensor driving unit may transmit the first sensing signal to the first pen sensing electrode and transmit the second sensing signal to the first pen sensing electrode when the input device overlaps the foldable area.

The electronic device may further include a plurality of lower members that are disposed under the display layer and overlap the plurality of non-foldable areas.

When viewed on a plane, the plurality of lower members may not overlap at least a portion of the foldable area.

The plurality of lower members may include a conductive shielding layer having conductivity.

The electronic device may further include a first bracket disposed under the plurality of lower members, and when viewed in a plan view, the first bracket may overlap the foldable area and the plurality of non-foldable areas.

The electronic device may further include a plurality of second brackets disposed under the plurality of lower members, and a first separation distance between the plurality of lower members may be less than a second separation distance between the plurality of second brackets.

The first driving frequency may be higher than the second driving frequency.

The first pen sensing electrode may include a plurality of first pen sensing electrodes, and two first pen sensing electrodes spaced apart from each other may be electrically connected to each other.

The sensor driving unit may transmit the first sensing signal or the second sensing signal to one of the two first pen sensing electrodes.

The first pen sensing electrode and the second pen sensing electrode may communicate with the input device.

The input device may include an electromagnetic resonance pen.

The input device may include an inductor and a capacitor.

The foldable area may be spaced apart from the plurality of non-foldable areas in a first direction, and the first pen sensing electrode may extend in a second direction that crosses the first direction.

According to an embodiment, an electronic device includes a display layer that includes a first area and a second area adjacent to the first area, a sensor layer disposed on the display layer and that includes a plurality of detection electrodes, and a sensor driving unit that drives the sensor layer. The plurality of detection electrodes include a plurality of first sensing electrodes, a plurality of second sensing electrodes that are insulated from and cross the plurality of first sensing electrodes, a plurality of first pen sensing electrodes that are adjacent to the plurality of first sensing electrodes and are insulated from and cross the plurality of second sensing electrodes, and a plurality of second pen sensing electrodes that are adjacent to the plurality of second sensing electrodes and are insulated from and cross the plurality of first sensing electrodes and the plurality of first pen sensing electrodes. The sensor driving unit transmits a first sensing signal that has a first driving frequency to a first pen sensing electrode that forms a magnetic flux in the first area and transmits a second sensing signal that has a second driving frequency that differs from the first driving frequency to a first pen sensing electrode that forms a magnetic flux in the second area.

The electronic device may further include a plurality of lower members disposed under the display layer and that overlap the second area.

When viewed in a plan view, the plurality of lower members do not overlap at least a portion of the first area.

The plurality of lower members may include a conductive shielding layer.

The electronic device may further include a first bracket disposed under the plurality of lower members, and when viewed in a plan view, the first bracket may overlap the first area and the second area.

The electronic device may further include a plurality of second brackets disposed under the plurality of lower members, and a first separation distance between the plurality of lower members may be less than a second separation distance between the plurality of second brackets.

The first driving frequency may be higher than the second driving frequency.

The plurality of first pen sensing electrodes and the plurality of second pen sensing electrodes may communicate with an external input device.

The first area may be spaced apart from the second area in a first direction, and each of the plurality of first pen sensing electrodes may extend in a second direction that crosses the first direction.

Two first pen sensing electrodes spaced apart from each other may be electrically connected to each other.

The sensor driving unit may transmit the first sensing signal or the second sensing signal to one of the two first pen sensing electrodes.

DETAILED DESCRIPTION

Figure 1:
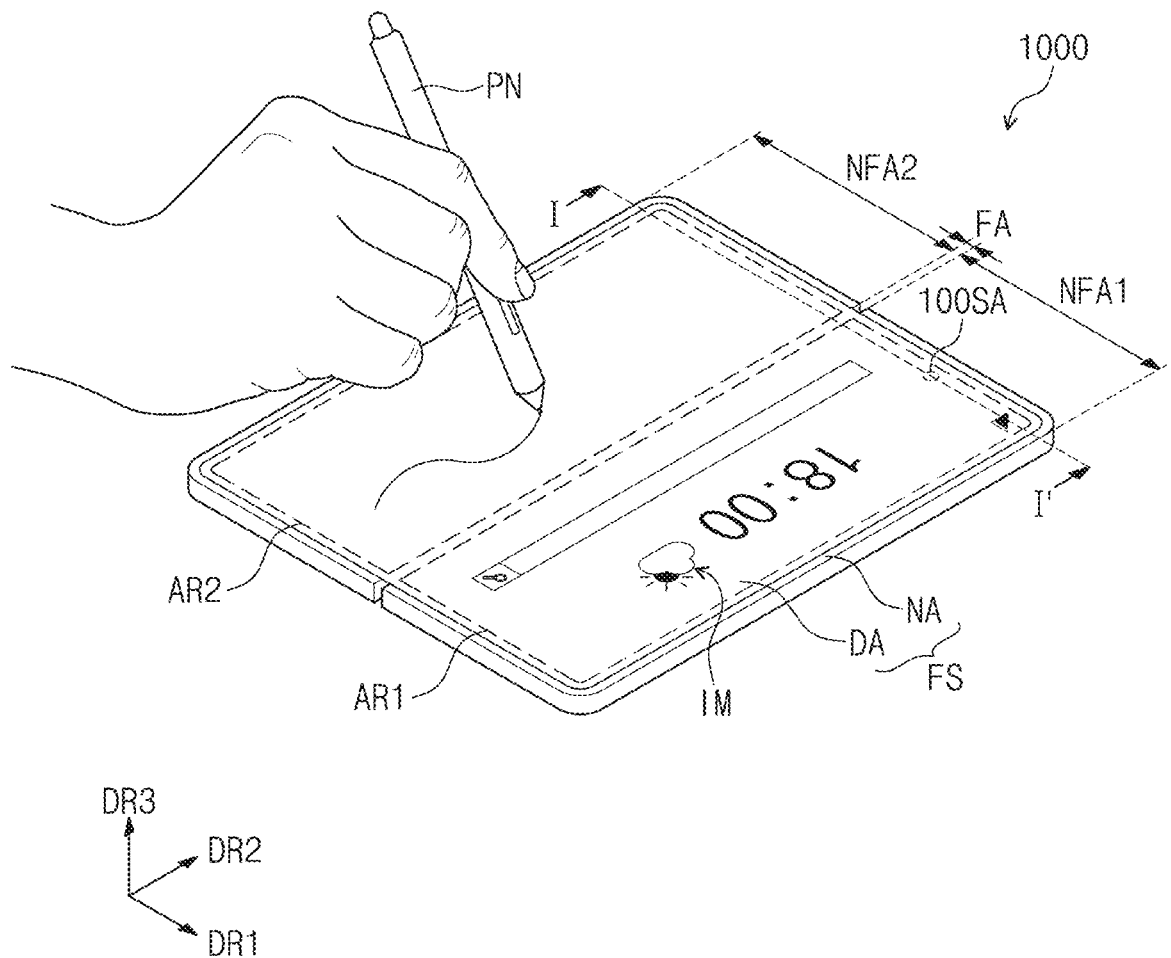
FIG. 1 is a perspective view of an interface device according to an embodiment of the present disclosure.

In the present specification, the expression that a first component, or area, layer, part, portion, etc., is "on", "connected with", or "coupled to" a second component means that the first component is directly on, connected with, or coupled to the second component or means that a third component is interposed therebetween.

The same reference numerals may refer to the same components.

Hereinafter, an embodiment of the present disclosure will be described with reference to accompanying drawings.

Figure 2:
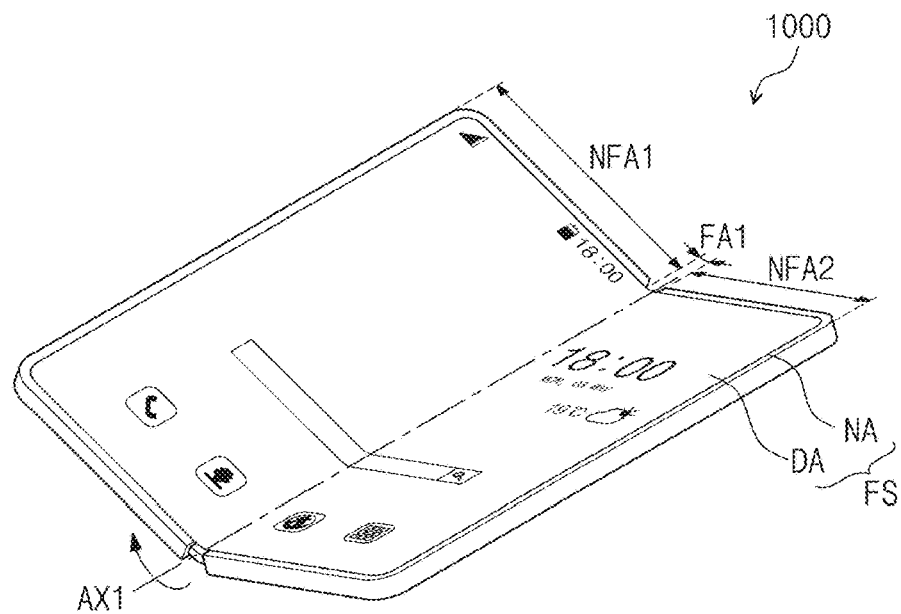
FIGS. 2 and 3 are perspective views of a folded electronic device according to an embodiment of the present disclosure.
Figure 2:
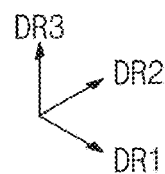
Figure 3:
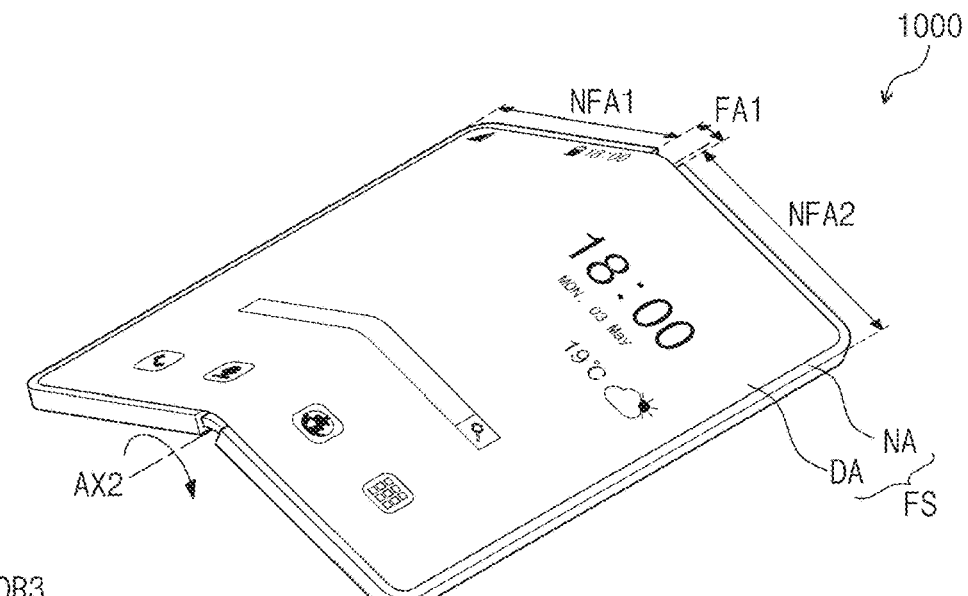
Figure 3:
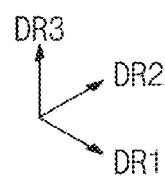

FIG. 1 is a perspective view of an interface device according to an embodiment of the present disclosure, and FIGS. 2 and 3 are perspective views of a folded electronic device according to an embodiment of the present disclosure.

Referring to FIGS. 1 to 3, in an embodiment, an interface device includes an electronic device 1000 and an input device PN.

The electronic device 1000 is activated by an electric signal. The electronic device 1000 includes various embodiments. For example, the electronic device 1000 may be a tablet personal computer (PC), a laptop, a computer, or a smart television, etc. In an embodiment, the electronic device 1000 is illustrated as a smart phone.

Figure 5:
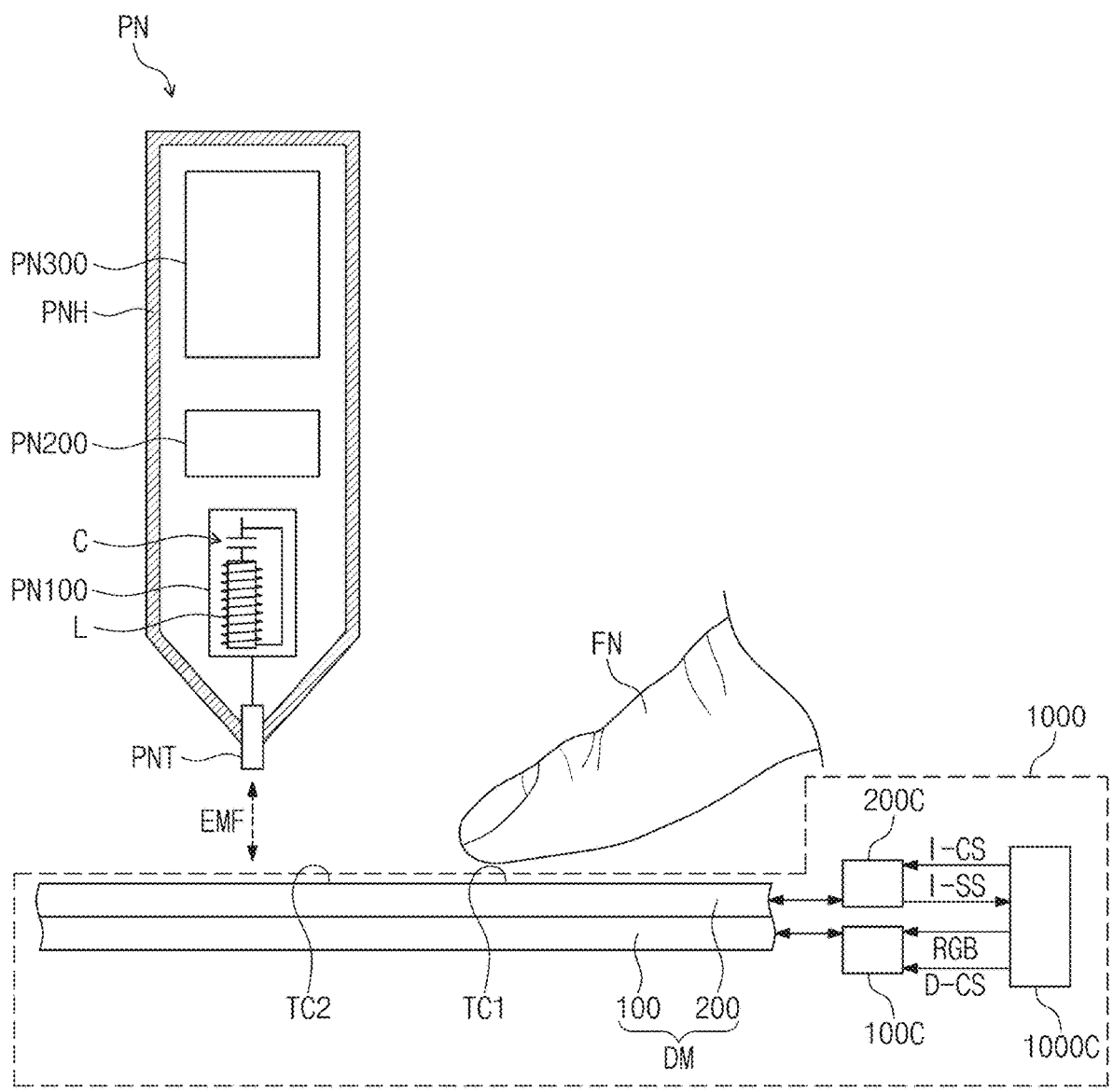
FIG. 5 is a schematic block diagram of an electronic device and an input device according to an embodiment of the present disclosure.

The electronic device 1000 includes a display layer 100 (see FIG. 5). The display layer 100 (see FIG. 5) includes a display surface FS. The display surface FS is parallel to a plane defined by a first direction DR1 and a second direction DR2. A normal direction of the display surface FS, such as a thickness direction of the electronic device 1000, is a third direction DR3. The electronic device 1000 displays an image IM in the third direction DR3 in the display surface FS. Front surfaces (or upper surfaces) and rear surfaces (or lower surfaces) of members can be distinguished by the third direction DR3. The wording "in a plan view" refers to being viewed from the third direction DR3.

The image IM may include a still image as well as a moving image. In FIGS. 1 to 3, an Internet search window and a watch window are illustrated as examples of the image IM.

The electronic device 1000 can detect an external input. The external input may be a user's input. The user's input may include various types of input, such as a portion of a user's body, an electromagnetic pen PN that generates a magnetic field, a light beam, heat or pressure.

For example, the external input may be a contact by a portion of the user's body, such as a hand, or an external input, such as hovering, that is close to the electronic device 1000 or adjacent to the electronic device 1000 at a predetermined distance. Further, the external input may have various forms, such as a force, a pressure, a temperature, and/or a light beam. Further, the electronic device 1000 according to the present disclosure can detect an external input by the pen PN. The pen PN may be referred to as the input device PN. Further, the electronic device 1000 can detect a plurality of inputs that have different forms. For example, the electronic device 1000 can detect an external input through the input device PN and an external input through the user's hand.

FIG. 1 illustrates an external input from the input device PN. In addition, the input device PN can be mounted on or detached from an inside or outside of the electronic device 1000, and the electronic device 1000 can transmit or receive a signal that corresponds to the mounting and detaching of the input device PN.

The display surface FS includes a display area DA and a peripheral area NA. The peripheral area NA is adjacent to the display area DA. The peripheral area NA has a lower light transmittance than the display area DA and has a predetermined color.

In an embodiment, the peripheral area NA surrounds the display area DA. Accordingly, a shape of the display area DA is substantially defined by the peripheral area NA. However, embodiments are not necessarily limited thereto, and in some embodiments, the peripheral area NA is adjacent to only one side of the display area DA or is omitted.

The electronic device 1000 according to an embodiment of the present disclosure can be folded about a predetermined folding axis. For example, as illustrated in FIG. 2, a virtual first folding axis AX1 that extends in the second direction DR2 is defined in the electronic device 1000. The first folding axis AX1 extends on the display surface FS in the second direction DR2.

The display area DA includes a foldable area FA that can be folded about the first folding axis AX1 and a first non-foldable area NFA1 and a second non-foldable area NFA2 spaced apart from each other in the first direction DR1 with the foldable area FA interposed therebetween. The foldable area FA may be referred to as a first area, and the non-foldable areas NFA1 and NFA2 may be referred to as a second area. The electronic device 1000 can be folded with respect to the first folding axis AX1 and can be folded in an in-folding manner in which the first non-foldable area NFA1 and the second non-foldable area NFA2 are folded to face each other. However, embodiments are not necessarily limited thereto.

In some embodiments, as illustrated in FIG. 3, the electronic device 1000 can be folded in an out-folding manner in which the first non-foldable area NFA1 and the second non-foldable area NFA2 are folded about a second folding axis AX2 in directions opposite to each other.

At least one sensing area 100SA may be defined in the electronic device 1000. FIG. 1 illustrates one sensing area 100SA disposed in the first non-foldable area NFA1, but an area in which the sensing area 100SA is disposed is not necessarily limited thereto. In some embodiments, a plurality of sensing areas 100SA are provided, and a plurality of sensing areas 100SA are arranged in the second non-foldable area NFA2.

The sensing area 100SA overlaps an electronic module. The electronic module is one or more of a camera module, a proximity illumination sensor, etc. Some of the electronic modules receive an external input through the sensing area 100SA, or transmit output through the sensing area 100SA.

The sensing area 100SA is surrounded by the display area DA. However, embodiments are not necessarily limited thereto, and in some embodiments, the sensing area 100SA is included in the display area DA. For example, the sensing area 100SA in the display area DA also displays the image IM. Transmittance of the sensing area 100SA is higher than transmittance of the display area DA.

According to an embodiment of the present disclosure, an electronic module 600 (see FIG. 7) is surrounded by or overlaps the display area DA. Thus, an area in which the electronic module 600 (see FIG. 7) is to be disposed need not be provided in the peripheral area NA around the display area DA. As a result, a ratio of an area of the display area DA to an entire surface of the electronic device 1000 increases.

The display area DA includes a first area AR1 and a second area AR2. The second area AR2 is spaced apart from the first area AR1 in the first direction DR1.

The image IM is displayed on the first area AR1 and the second area AR2. The second area AR2 is where the external input is recognized through the input device PN. The first area AR1 is where the external input is not recognized through the input device PN.

When viewed in a plan view, the first area AR1 overlaps the first non-foldable area NFA1. When viewed in a plan view, the second area AR2 overlaps the second non-foldable area NFA2. However, embodiments are not necessarily limited thereto. For example, in some embodiments, when viewed in a plan view, the first area AR1 also overlaps the second non-foldable area NFA2, and the second area AR2 also overlaps the first non-foldable area NFA1.

FIG. 1 illustrates that an area of the first area AR1 is the same as an area of the second area AR2, but the areas of the first area AR1 and the second area AR2 according to an embodiment of the present disclosure are not necessarily limited thereto. For example, in some embodiments, the area of the first area AR1 and the area of the second area AR2 differ from each other.

Figure 4:
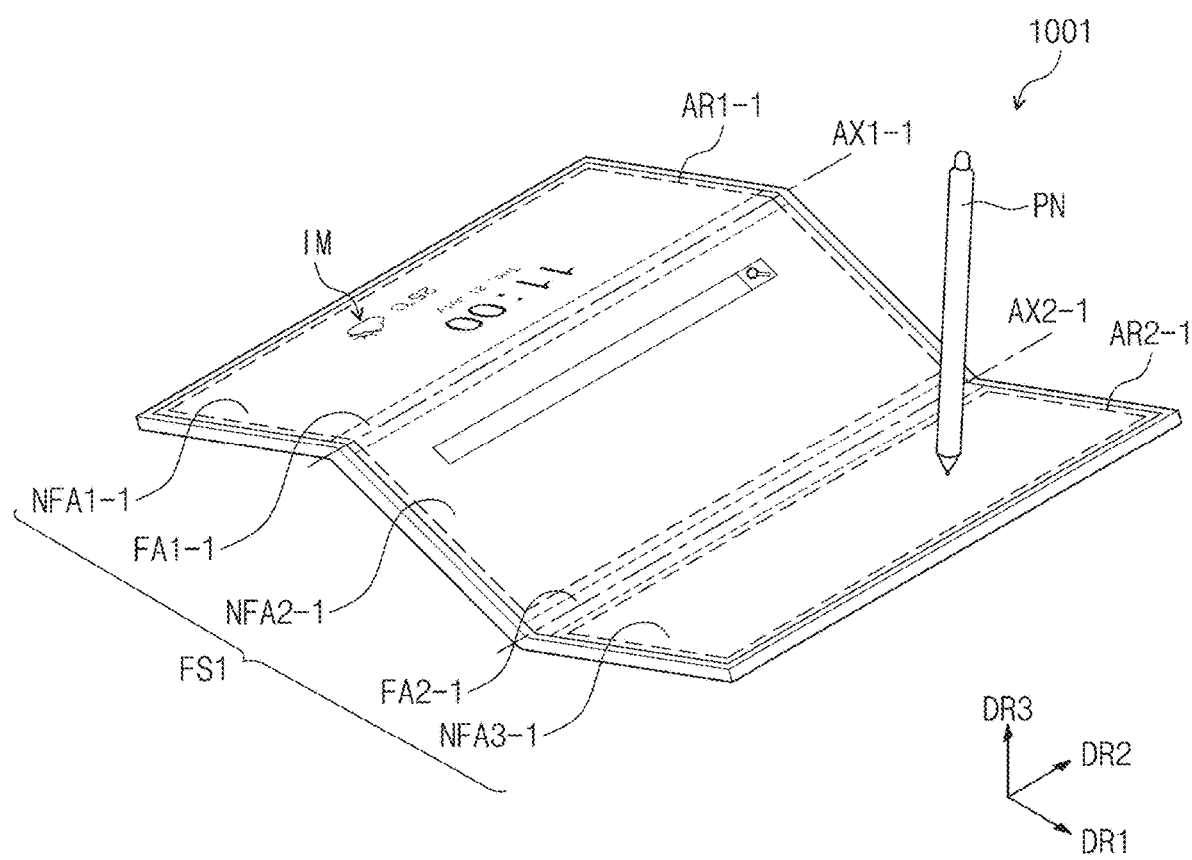
FIG. 4 is a perspective view of an electronic device according to an embodiment of the present disclosure.

FIG. 4 is a perspective view of an electronic device according to an embodiment of the present disclosure.

Referring to FIG. 4, in an embodiment, a plurality of folding axes AX1-1, AX2-1 are defined in an electronic device 1001. The first folding axis AX1-1 and the second folding axis AX2-1 extend in the second direction DR2 and are spaced apart from each other in the first direction DR1. A display surface FS1 of the electronic device 1001 displays the image IM. The electronic device 1001 includes a first foldable area FA1-1 and a second foldable area FA2-1 that are respectively folded about the first folding axis AX1-1 and the second folding axis AX2-1, and a first non-foldable area NFA1-1, a second non-foldable area NFA2-1, and a third non-foldable area NFA3-1 that are spaced apart from each other in the first direction DR1 with the first foldable area FA1-1 and the second foldable area FA2-1 interposed therebetween.

The electronic device 1001 can be folded about the first folding axis AX1-1 in an out-folding manner. Accordingly, the electronic device 1001 can be folded such that the first non-foldable area NFA1-1 and the second non-foldable area NFA2-1 face each other with respect to the first folding axis AX1-1. Further, the electronic device 1001 can be in-folded about the second folding axis AX2-1. Accordingly, the electronic device 1001 can be folded such that the second non-foldable area NFA2-1 and the third non-foldable area NFA3-1 face each other.

In addition, the electronic device 1001 can also be folded about the first folding axis AX1-1 and the second folding axis AX2-1 in the same manner. Further, the electronic device 1001 according to an embodiment of the present disclosure can be folded about three or more folding axes, and an extension direction of the folding axes may be a direction other than the second direction DR2. As long as the electronic device 1001 can detect the external input and be folded, the electronic device 1001 is not limited to an embodiment.

An active area of the display surface FS1 includes a first area AR1-1 and a second area AR2-1. The second area AR2-1 is spaced apart from the first area AR1-1 in the first direction DR1.

The image IM is displayed on the first area AR1-1 and the second area AR2-1. The second area AR2-1 is where an external input through the input device PN is recognized. The first area AR1-1 is where no external input through the input device PN is recognized.

When viewed in a plan view, the second area AR2-1 overlaps the third non-foldable area NFA3-1. When viewed in a plan view, the first area AR1-1 overlaps the first non-foldable area NFA1-1 and the second non-foldable area NFA2-1.

FIG. 4 illustrates an embodiment in which an area of the first area AR1-1 is greater than an area of the second area AR2-1, but the areas of the first area AR1-1 and the second area AR2-1 according to an embodiment of the present disclosure are not necessarily limited thereto. For example, according to an embodiment of the present disclosure, the area of the second area AR2-1 is greater than the area of the first area AR1-1.

FIG. 5 is a schematic block diagram of an electronic device and an input device according to an embodiment of the present disclosure.

Referring to FIG. 5, in an embodiment, the electronic device 1000 includes a display module DM, a display driving unit 100C, a sensor driving unit 200C, and a main driving unit 1000C.

The display module DM includes the display layer 100 and a sensor layer 200.

The display layer 100 displays an image. The display layer 100 according to an embodiment of the present disclosure is a light emitting display layer, but embodiments of the present disclosure are not necessarily limited thereto. For example, the display layer 100 is one of an organic light emitting display layer, a quantum dot display layer, a micro light emitting diode (LED) display layer, or a nano LED display layer. A light emitting layer of an organic light emitting display layer includes an organic light emitting material. A light emitting layer of a quantum dot display layer includes a quantum dot and a quantum rod. A light emitting layer of a micro LED display layer includes a micro LED. A light emitting layer of a nano LED display layer includes a nano LED.

The sensor layer 200 is disposed on the display layer 100. The sensor layer 200 can detect an external input received from an external unit. The sensor layer 200 can detect a first input from a user's body FN and a second input by the input device PN.

The sensor layer 200 is directly disposed on the display layer 100. According to an embodiment of the present disclosure, the sensor layer 200 is formed on the display layer 100 through a continuous process. For example, the sensor layer 200 is directly formed on the display layer 100 without a separate coupling member such as an adhesive film. However, embodiments of the present disclosure are not necessarily limited thereto, and in some embodiments, the sensor layer 200 is coupled to the display layer 100 with the coupling member, such as the adhesive film, interposed therebetween. For example, after the sensor layer 200 is manufactured through a separate process from the display layer 100, the sensor layer 200 is coupled to an upper surface of the display layer 100 by the adhesive film.

The sensor layer 200 according to an embodiment of the present disclosure further includes a plurality of detection electrodes. The sensor layer 200 detects position or intensity information of the external input through a change in a capacitance or resistance between the detection electrodes that are caused by the received external input. The sensor layer 200 detects a position or intensity of the input device PN that is applied to a window 500 (see FIG. 6). The sensor layer 200 can be driven using electromagnetic resonance (EMR). However, embodiments are not necessarily limited thereto, and in other embodiments, the sensor layer 200 can incorporate various other driving methods as long as the sensor layer 200 can detect an input from the input device PN.

The main driving unit 1000C controls an overall operation of the electronic device 1000. For example, the main driving unit 1000C controls operations of the display driving unit 100C and the sensor driving unit 200C. The main driving unit 1000C includes at least one microprocessor, and the main driving unit 1000C may be referred to as a "host".

The display driving unit 100C controls the display layer 100. The main driving unit 1000C further includes a graphic controller. The display driving unit 100C receives image data RGB and a control signal D-CS from the main driving unit 1000C. The control signal D-CS includes various signals. For example, the control signal D-CS includes an input vertical synchronization signal, an input horizontal synchronization signal, a main clock, a data enable signal, etc. The display driving unit 100C generates the vertical synchronization signal and the horizontal synchronization signal that control a timing of signals transmitted to the display layer 100 based on the control signal D-CS.

The sensor driving unit 200C controls the sensor layer 200. The sensor driving unit 200C receives a control signal I-CS from the main driving unit 1000C. The control signal I-CS includes a mode determination signal that determines a driving mode of the sensor driving unit 200C and a clock signal. Based on the control signal I-CS, the sensor driving unit 200C may operate in a first mode in which a first input TC1 from a user's body FN is detected or a second mode in which a second input TC2 from the input device PN is detected. Based on the mode determination signal, the sensor driving unit 200C controls the sensor layer 200 to operate in the first mode or the second mode, which will be described below.

The sensor driving unit 200C calculates coordinate information of the first input TC1 or the second input TC2 based on the signal received from the sensor layer 200 and provides a coordinate signal I-SS that includes the coordinate information to the main driving unit 1000C. The main driving unit 1000C executes an operation that corresponds to the user's input based on the coordinate signal I-SS. For example, the main driving unit 1000C operates the display driving unit 100C to display a new application image on the display layer 100 based on the coordinate signal I-SS.

The input device PN includes an electromagnetic resonance pen. The input device PN includes a housing PNH, a pen tip PNT, a resonance circuit unit PN100, a controller PN200, and a power unit PN300.

The housing PNH has a pen shape. An accommodation space is formed inside the housing PNH. The resonance circuit unit PN100, the controller PN200, and the power unit PN300 are accommodated in the accommodation space defined inside the housing PNH.

The pen tip PNT is disposed at an end of the housing PNH. For example, a portion of the pen tip PNT is exposed to the outside of the housing PNH, and the other portion of the pen tip PNT is inserted into the housing PNH.

The resonance circuit unit PN100 generates a signal. The resonance circuit unit PN100 includes an application-specific integrated circuit or an oscillator. The resonance circuit unit PN100 outputs an alternating current (AC) signal that has a frequency of a predetermined value.

The resonance circuit unit PN100 includes an inductor L and a capacitor C connected to the inductor L. An LC resonance circuit is formed by the inductor L and the capacitor C. The capacitor C is a variable capacitor that has a variable capacity. The input device PN can be disposed on the display module DM, and the capacitor "C" can be charged during a charging period.

The power unit PN300 supplies power to the controller PN200. The power unit PN300 includes at least one of a battery or a high-capacity capacitor, etc. However, embodiments are not necessarily limited thereto, and in some embodiments, the power unit PN300 is omitted.

An electromagnetic field EMF forms between the input device PN and the sensor layer 200. The sensor driving unit 200C determines a signal by detecting resonance due to electromagnetic induction that occurs between the input device PN and the sensor layer 200.

Figure 6:
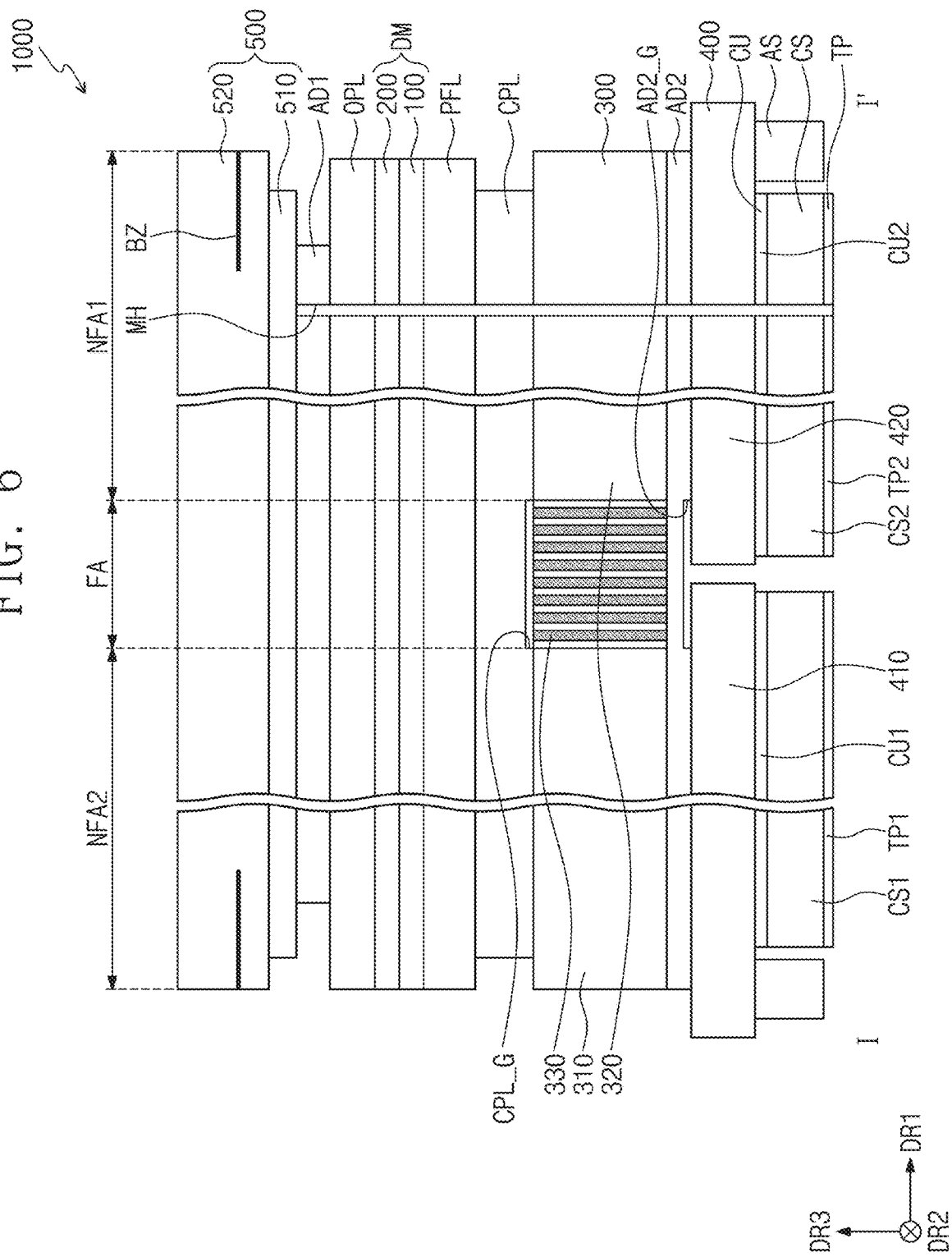
FIG. 6 is a cross-sectional view of an electronic device taken along line I-I' of FIG. 1 according to an embodiment of the present disclosure.

FIG. 6 is a cross-sectional view of an electronic device taken along line I-I' of FIG. 1, according to an embodiment of the present disclosure.

Referring to FIGS. 1 and 6, in an embodiment, the electronic device 1000 includes the display module DM, a first support plate 300, a second support plate 400, and the window 500. The electronic device 1000 further includes various other functional layers in addition to the display module DM, the first support plate 300, the second support plate 400, and the window 500. For example, the electronic device 1000 further includes a plurality of adhesive layers AD1 and AD2, an optical layer OPL, a panel protecting film PFL, a lower protective film CPL, a shielding layer CU, a cushion layer CS, an insulating layer TP, and a step compensation member AS.

The display module DM is a flexible panel. Accordingly, the display module DM can be rolled up as a whole or can be folded or unfolded about the folding axis. The display module DM includes the display layer 100 and the sensor layer 200.

The first support plate 300 is disposed under the display module DM and supports the display module DM. The first support plate 300 includes a first support part 310, a second support part 320, and a foldable part 330. The first support part 310 and the second support part 320 are spaced apart from each other in the first direction DR1 with the foldable part 330 interposed therebetween.

The first support part 310 overlaps the second non-foldable area NFA2. The second support part 320 overlaps the first non-foldable area NFA1. Each of the first support part 310 and the second support part 320 according to an embodiment of the present disclosure are insulators. For example, each of the first support part 310 and the second support part 320 is formed of plastic or glass.

The foldable part 330 overlaps the foldable area FA. A plurality of holes are formed that pass through the foldable part 330. Accordingly, the foldable part 330 has a lattice shape in a plan view.

A shape of the foldable part 330 is easily changed by the plurality of holes when the foldable part 330 is folded. The foldable part 330 according to an embodiment of the present disclosure includes a different material from the first support part 310 and the second support part 320. For example, the foldable part 330 includes a single metal or an alloy. Accordingly, the foldable part 330 can stably protect the foldable area FA of the display module DM even in a folded state. However, embodiments are not necessarily limited thereto, and in some embodiments, the first support part 310, the second support part 320, and the foldable part 330 are formed of the same material. In addition, the plurality of holes are filled with a highly ductile material.

The second support plate 400 is disposed under the first support plate 300. The second support plate 400 includes a first plate 410 and a second plate 420 spaced apart from each other in the first direction DR1.

The first plate 410 overlaps the second non-foldable area NFA2. The second plate 420 overlaps the first non-foldable area NFA1.

The second support plate 400 has a higher modulus than the first support plate 300. For example, the first and second plates 410 and 420 include materials that have a higher moduli than the first and second support parts 310 and 320. For example, each of the first and second plates 410 and 420 includes a metal such as a copper alloy or a steel use stainless (SUS).

The window 500 is disposed on the display module DM. The window 500 provides an optically transparent area. The window 500 provides a front surface of the electronic device 1000. The external input from the input device PN, etc., is substantially applied to the window 500. The image IM displayed on the display layer 100 is perceived by the user through the window 500.

The window 500 includes a thin glass or a synthetic resin film. When the window 500 includes a thin film glass, a thickness of the window 500 is 100 µm or less, such as 30 µm, but the thickness of the window 500 is not necessarily limited thereto. When the window 500 includes a synthetic resin film, the window 500 include a polyimide (PI) film or a polyethylene terephthalate (PET) film.

The window 500 may have a multi-layer structure or a single-layer structure. For example, the window 500 includes a plurality of synthetic resin films coupled with an adhesive, or includes a glass substrate and a synthetic resin film coupled with an adhesive. The window 500 is made of a flexible material. Accordingly, the window 500 can be folded or unfolded about the first folding axis AX1 (see FIGS. 2 and 3). For example, when a shape of the display layer 100 changes, a shape of the window 500 also changes to correspond to the shape of the display layer 100.

The window 500 transmits an image from the display layer 100, and at the same time, alleviates an external impact, thereby preventing the display module DM from being damaged or malfunctioning due to the external impact. An external impact refers to an externally applied force, which can be expressed as a pressure, a stress, etc., and causes a defect in the display module DM.

In addition, the electronic device 1000 further includes a protective layer disposed on the window 500. The protective layer increases impact resistance of the window 500 and prevents shattering when the window 500 is broken. The protective layer includes at least one of a urethane-based resin, an epoxy-based resin, a polyester-based resin, a polyether-based resin, an acrylate-based resin, an acrylonitrile-butadiene-styrene (ABS) resin, or rubber. For example, the protective layer includes at least one of phenylene, polyethyleneterephthalate (PET), polyimide (PI), polyamide (PAI), polyethylene naphthalate (PEN), or polycarbonate (PC).

In other embodiments, the electronic device 1000 further includes one or more functional layers arranged between the display module DM and the window 500. For example, the functional layer is an anti-reflection layer that blocks reflection of an external light beam. The anti-reflection layer prevents elements of the electronic device 1000 from being visually recognized from the outside by a user due to external light incident to the front surface of the electronic device 1000. The anti-reflection layer includes one or more of a retarder, a polarizer, or a color filter.

The optical layer OPL and the adhesive layer AD1 are interposed between the window 500 and the display module DM. The window 500 includes a first layer 510, a second layer 520, and a bezel pattern BZ. The first layer 510 includes a glass. The first layer 510 has a thickness of about 10 µm or less. Accordingly, the first layer 510 can be easily folded.

The second layer 520 is disposed on the first layer 510. The second layer 520 includes a material that has a relatively low modulus compared to the first layer 510. For example, the second layer 520 is a film that contains an organic material. The second layer 520 has a greater thickness than the first layer 510. The second layer 520 protects an upper surface of the first layer 510.

The bezel pattern BZ is inserted into the second layer 520. However, embodiments are not necessarily limited thereto, and in some embodiments, the bezel pattern BZ is disposed on a lower surface or an upper surface of the second layer 520. The bezel pattern BZ has a predetermined color or a reflective pattern. However, embodiments are not necessarily limited thereto, and in some embodiments, the the bezel pattern BZ is omitted from the window 500. Further, the window 500 according to an embodiment of the present disclosure may be formed as a single layer or may further include other functional layers, but embodiments of the present disclosure are not necessarily limited thereto.

The optical layer OPL is disposed on the display layer 100. The optical layer OPL reduces reflectance of external light. The optical layer OPL includes a stretched synthetic resin film. For example, the optical layer OPL is formed by dyeing a polyvinyl alcohol (PVA) film with an iodine compound. In some embodiments, the optical layer OPL includes a color filter. The optical layer OPL can include various other layers as long as the layers reduce the reflectance of external light, and is not limited to an embodiment.

The optical layer OPL and the window 500 are coupled by the predetermined adhesive layer AD1. The adhesive layer AD1 includes at least one of an optical clear adhesive (OCA), an optical clear resin (OCR), or a pressure sensitive adhesive (PSA). Adhesive layers described below include the same material as the first adhesive layer AD1, and include general adhesives or pressure-sensitive adhesives.

The panel protecting film PFL and the lower protective film CPL are interposed between the display layer 100 and the first support plate 300.

The panel protecting film PFL is disposed under the display layer 100. The panel protecting film PFL protects a lower portion of the display layer 100. The panel protecting film PFL includes a flexible plastic material. For example, the panel protecting film PFL includes polyethylene terephthalate.

The lower protective film CPL is disposed under the panel protecting film PFL. The lower protective film CPL has a predetermined color. The lower protective film CPL prevents a rear surface of the display layer 100 from being illuminated by light while protecting the rear surface of the display layer 100. The lower protective film CPL is formed of a material that has high light absorption.

In addition, a predetermined recessed part CPL_G that overlaps the foldable area FA is formed in the lower protective film CPL. The recessed part CPL_G reduces a folding stress by reducing a thickness of the foldable area FA of the lower protective film CPL. Further, by adding an adhesive layer to the recessed part CPL_G, a coupling force with the first support plate 300 is increased.

The first support plate 300 and the second support plate 400 are coupled through the predetermined adhesive layer AD2. A predetermined recessed part AD2_G that overlaps the foldable area FA is formed in the adhesive layer AD2. A folding stress in the foldable area FA is reduced through the recessed part AD2_G. However, embodiments are not necessarily limited thereto, and in some embodiments, the recessed part AD2_G is omitted from the adhesive layer AD2 or a portion of the adhesive layer AD2 that overlaps the foldable area FA is removed.

The shielding layer CU, the cushion layer CS, the insulating layer TP, and the step compensation member AS are disposed under the second support plate 400.

The shielding layer CU is disposed under the second support plate 400. The shielding layer CU is conductive. The shielding layer CU includes copper. For example, the shielding layer CU is a copper tape.

The shielding layer CU includes a first shielding layer CU1 and a second shielding layer CU2 spaced apart from each other in the first direction DR1. The first shielding layer CU1is disposed under the first plate 410. The second shielding layer CU2 is disposed under the second plate 420.

The cushion layer CS is disposed under the shielding layer CU. The cushion layer CS protects the display module DM by absorbing an external impact. The cushion layer CS includes a foam sheet that has a predetermined elastic force. For example, the cushion layer CS includes sponge or polyurethane. The cushion layer CS includes a plurality of layers CS1 and CS2, which are coupled to the first shielding layer CU1 and the second shielding layer CU2, respectively.

The insulating layer TP is disposed under the cushion layer CS. The insulating layer TP is an insulating film. The insulating layer TP prevents inflow of static electricity. The insulating layer TP includes a plurality of layers TP1 and TP2, which are coupled to the plurality of layers CS1 and CS2 of the cushion layer CS, respectively.

The step compensation member AS is coupled to a lower portion of the second support plate 400. The step compensation member AS may be a double-sided tape or an insulating film.

A through hole MH is extends through the adhesive layer AD1 to the insulating layer TP. An area in which the through hole MH is formed corresponds to the sensing area 100SA (see FIG. 1). An electronic module can be disposed under the through hole MH. The electronic module includes one or more of the camera module, the proximity illumination sensor, etc.

Figure 7A:
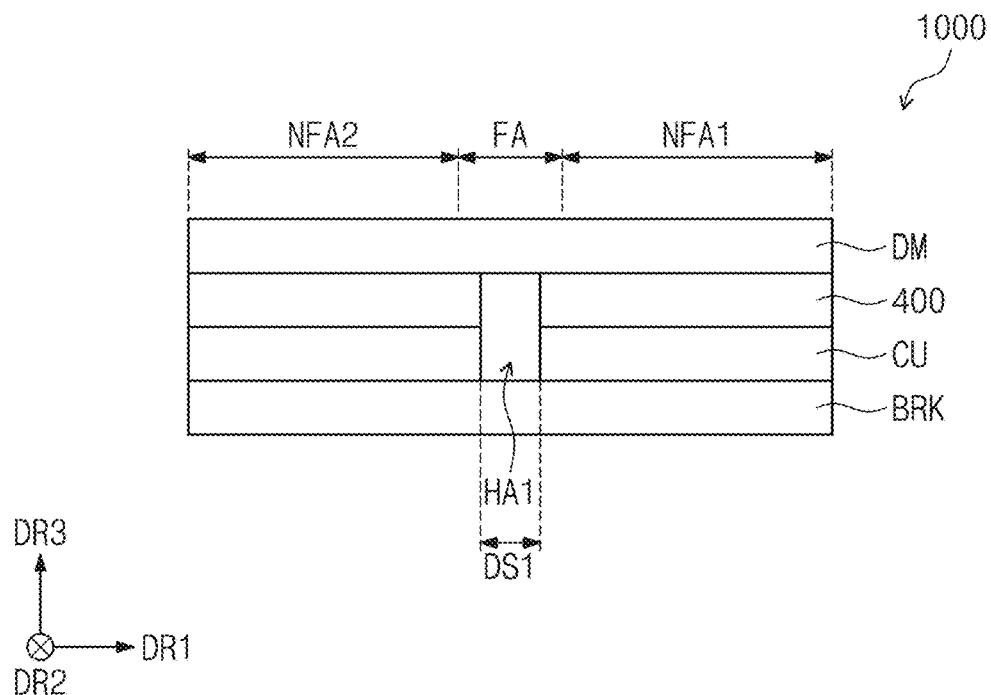
FIG. 7A is a schematic cross-sectional view of an electronic device according to an embodiment of the present disclosure.

FIG. 7A is a schematic cross-sectional view of an electronic device according to an embodiment of the present disclosure.

Referring to FIGS. 5, 6, and 7A, in an embodiment, the electronic device 1000 includes the display module DM, the second support plate 400, the shielding layer CU, and a first bracket BRK.

The second support plate 400 and the shielding layer CU may be referred to as a plurality of lower members. When viewed in a plan view, the second support plate 400 and the shielding layer CU do not overlap at least a portion of the foldable area FA.

The plurality of layers CU1 and CU2 of the shielding layer CU are spaced apart from each other by a first distance DS1 in the first direction DR1. The first distance DS1 is in a range of 0.5 mm to 2.0 mm. For example, the first distance DS1 is 1.5 mm.

In the foldable area FA, a first opening HA1 is formed whose width is the first distance DS1.

The first bracket BRK is disposed under the shielding layer CU. When viewed in a plan view the first bracket BRK overlaps the foldable area FA and the plurality of non-foldable areas NFA1 and NFA2. The first bracket BRK has an integral shape. The first bracket BRK covers the shielding layer CU. For example, the first bracket BRK covers the first opening HA1.

The first opening HA1 is an area of the foldable area FA of the electronic device 1000 that does not overlap the shielding layer CU. For example, at least a portion of the shielding layer CU is not disposed in the foldable area FA.

The input device PN and the sensor layer 200 resonate with each other by electromagnetic induction. For example, an inductance depends on a stacked structure of the lower members and the bracket, and accordingly, a resonant frequency can change. For example, a resonant frequency of the foldable area FA in which the first opening HA1 is formed differs from resonant frequencies of the non-foldable areas NFA1 and NFA2.

When viewed in a plan view, when the plurality of non-foldable areas NFA1 and NFA2 overlap the input device PN, a gap between the input device PN and the sensor layer 200 has a first resonant frequency. For example, the first resonant frequency is about 304.4 kHz.

When viewed in a plan view, when the foldable area FA overlaps the input device PN, a gap between the input device PN and the sensor layer 200 has a second resonance frequency. The second resonant frequency is lower than the first resonant frequency. For example, the second resonant frequency is about 304.2 kHz.

According to embodiments of the present disclosure, the sensor driving unit 200C transmits, to the sensor layer 200, one of a first sensing signal that has a first driving frequency or a second sensing signal that has a second driving frequency depending on a position of the input device PN with respect to the display area DA (see FIG. 1). Due to a difference between stacked structures of the lower members, a difference between signals received from the input device PN may be removed or reduced. A phenomenon in which a picture drawn by the input device PN is bent in the foldable area FA can be prevented. Thus, the electronic device 1000 has increased detection reliability, and an interface device that includes the same can be provided.

Figure 7B:
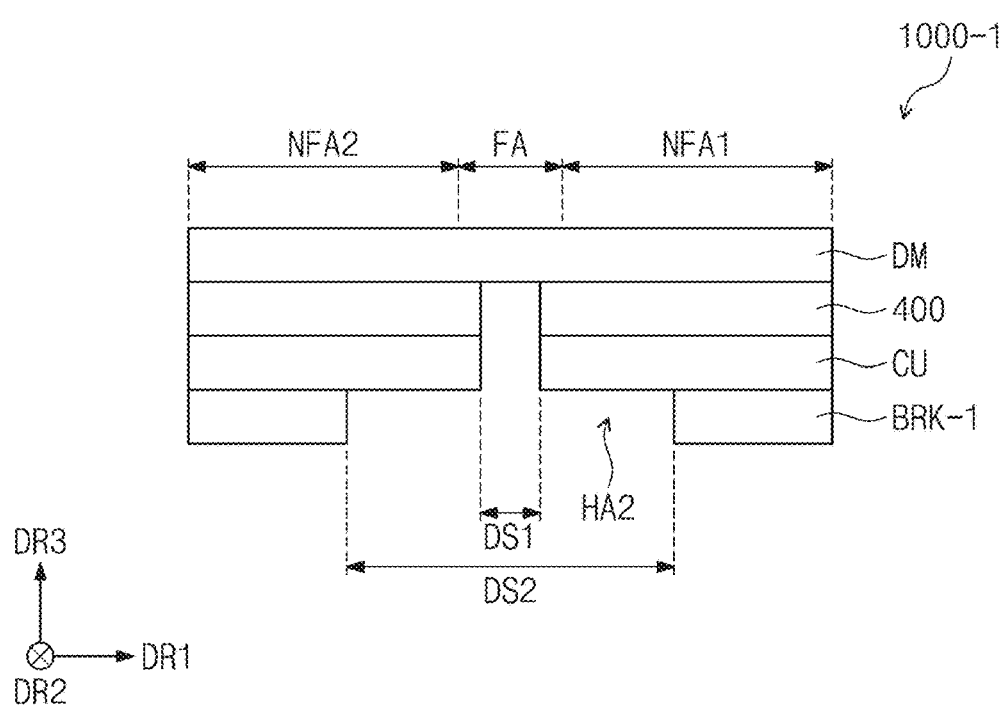
FIG. 7B is a schematic cross-sectional view of an electronic device according to an embodiment of the present disclosure.

FIG. 7B is a schematic cross-sectional view of an electronic device according to an embodiment of the present disclosure. In the description of FIG. 7B, components described with respect to FIG. 7A are designated by the same reference numerals, and a repeated description thereof will be omitted.

Referring to FIGS. 5 and 7B, in an embodiment, an electronic device 1000-1 includes the display module DM, the second support plate 400, the shielding layer CU, and a second bracket BRK-1.

The second bracket BRK-1 is disposed under the shielding layer CU. The second bracket BRK-1 includes a plurality of layers. The plurality of layers correspond to the plurality of non-foldable areas NFA1 and NFA2, respectively. The plurality of layers are spaced a second distance DS2 from each other in the first direction DR1. The second distance DS2 is in a range of 15 mm to 25 mm. For example, the second distance DS2 is about 20 mm.

The second distance DS2 is greater than the first distance DS1.

In the foldable area FA, a second opening HA2 is formed whose width is the second distance DS2.

The input device PN and the sensor layer 200 resonate with each other by electromagnetic induction. For example, the inductance can change depending on a stacked structure of the lower members and the bracket, and a resonant frequency can change. For example, a resonant frequency of the foldable area FA in which the first opening HA1 and the second opening HA2 are formed differs from resonant frequencies of the non-foldable areas NFA1 and NFA2.

When viewed in a plan view, when the plurality of non-foldable areas NFA1 and NFA2 overlap the input device PN, a gap between the input device PN and the sensor layer 200 has the first resonant frequency. For example, the first resonant frequency is about 304.4 kHz.

When viewed in a plan view, when the foldable area FA overlaps the input device PN, a gap between the input device PN and the sensor layer 200 has a third resonance frequency. The third resonant frequency is lower than the first resonant frequency. For example, the third resonant frequency is about 302.4 kHz.

According to embodiments of the present disclosure, the sensor driving unit 200C transmits to the sensor layer 200 one of the first sensing signal that has the first driving frequency or the second sensing signal that has the third driving frequency depending on the position of the input device PN with respect to the display area DA (see FIG. 1). Due to the difference between the stacked structures of the lower members, the difference between the signals received from the input device PN can be removed or reduced. The phenomenon in which a picture drawn by the input device PN is bent in the foldable area FA can be prevented. Thus, the electronic device 1000 has increased detection reliability and an interface device that includes the same can be provided.

Figure 8:
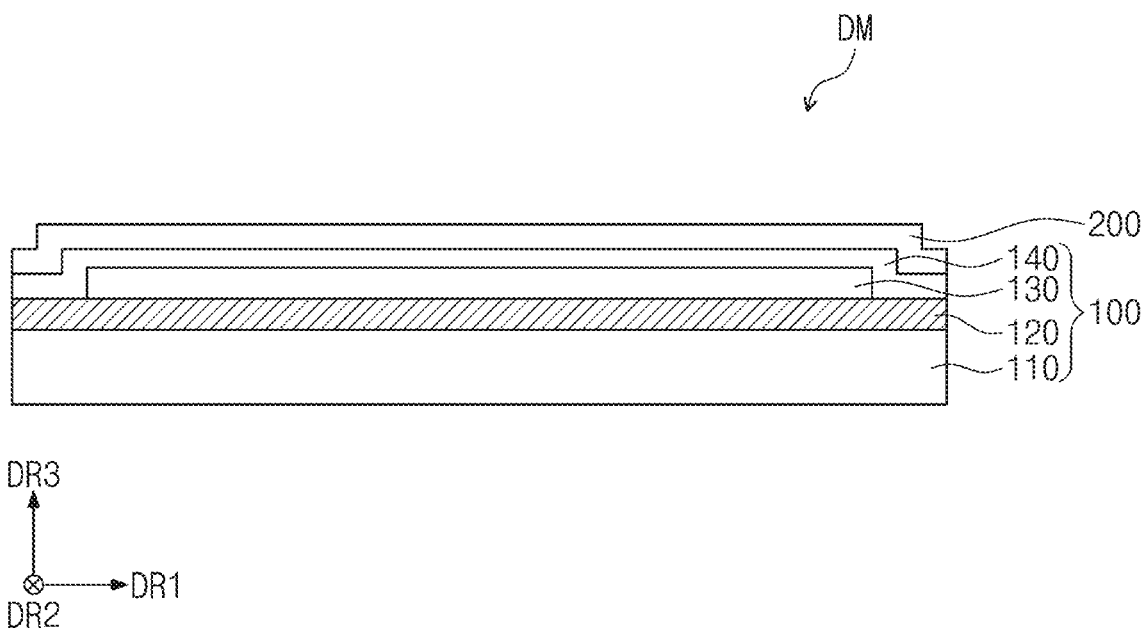
FIG. 8 is a cross-sectional view of a display module according to an embodiment of the present disclosure.

FIG. 8 is a cross-sectional view of a display module according to an embodiment of the present disclosure.

Referring to FIG. 8, in an embodiment, the display module DM includes the display layer 100 and the sensor layer 200. A thickness of the display module DM is in a range of 25 micrometers to 35 micrometers, such as 30 micrometers, but the thickness of the display module DM is not necessarily limited thereto. The display module DM includes at least one foldable area. A foldable area of the display module DM corresponds to the foldable area FA (see FIG. 1).

The display layer 100 includes a base layer 110, a circuit layer 120, a light emitting element layer 130, and an encapsulation layer 140.

The base layer 110 includes a synthetic resin layer. The synthetic resin layer includes a thermosetting resin. The base layer 110 may have a multilayer structure. For example, the base layer 110 includes a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer. Each of the first and second synthetic resin layers include a polyimide-based resin. Further, each of the first and second synthetic resin layers include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. In the present specification, a "~~ based" resin means a resin containing a functional group of "~~". In addition, the base layer 110 may include a glass substrate, an organic/inorganic composite material substrate, etc.

The circuit layer 120 is disposed on the base layer 110. The circuit layer 120 includes an insulating layer, a semiconductor pattern, a conductive pattern, a signal line, etc. The insulating layer, a semiconductor layer, and a conductive layer are formed on the base layer 110 in a manner such as coating and deposition, and thereafter, the insulating layer, the semiconductor layer, and the conductive layer are selectively patterned through a plurality of photolithography processes. Thereafter, the semiconductor pattern, the conductive pattern, and the signal line of the circuit layer 120 are formed.

The light emitting element layer 130 is disposed on the circuit layer 120. The light emitting element layer 130 includes a light emitting element. For example, the light emitting element layer 130 includes one or more of an organic light emitting material, a quantum dot, a quantum rod, a micro LED, a nano LED, etc.

The encapsulation layer 140 is disposed on the light emitting element layer 130. The encapsulation layer 140 includes an inorganic layer, an organic layer, and an inorganic layer that are sequentially stacked, but layers of the encapsulation layer 140 are not necessarily limited thereto. The inorganic layers protect the light emitting element layer 130 from moisture and oxygen, and the organic layer protects the light emitting element layer 130 from foreign substances such as dust particles. The inorganic layers include at least one of a silicon nitride layer, a silicon oxy nitride layer, a silicon oxide layer, a titanium oxide layer, or an aluminum oxide layer, etc. The organic layer includes an acrylic-based organic layer, but embodiments of the present disclosure are not necessarily limited thereto.

The sensor layer 200 is disposed on the display layer 100. The sensor layer 200 is disposed on the encapsulation layer 140. The sensor layer 200 detects an external input received from an external unit. The external input may be that of a user. The user's input may include various types of external inputs, such as a portion of the user's body, a light beam, heat, a pen, or pressure.

The sensor layer 200 is formed on the display layer 100 through a continuous process. In an embodiment, the sensor layer 200 is directly disposed on the display layer 100. By 'directly disposed on the display layer 100' is meant that no third component is disposed between the sensor layer 200 and the display layer 100. For example, no separate adhesive member is disposed between the sensor layer 200 and the display layer 100.

In some embodiments, the sensor layer 200 is coupled to the display layer 100 through an adhesive member. The adhesive member may include a general adhesive or a pressure-sensitive adhesive.

Figure 9:
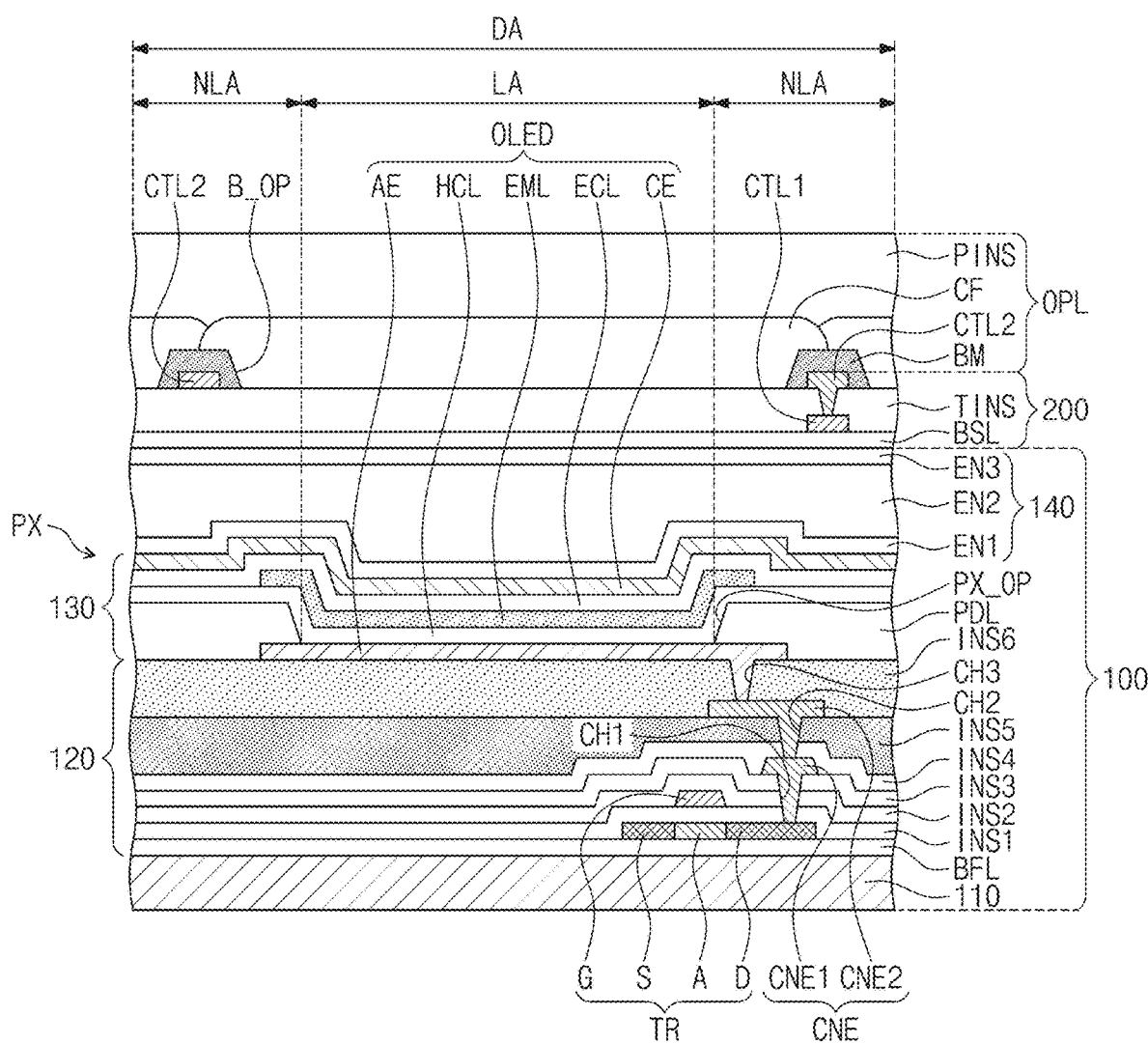
FIG. 9 is a cross-sectional view of a portion of an electronic device according to an embodiment of the present disclosure.

FIG. 9 is a cross-sectional view of a portion of a electronic device according to an embodiment of the present disclosure.

Referring to FIG. 9, in an embodiment, a pixel PX includes a transistor TR and a light emitting element OLED. The light emitting element OLED includes a first electrode AE (or an anode), a second electrode CE (or a cathode), a hole control layer HCL, an electron control layer ECL, and a light emitting layer EML.

The transistor TR and the light emitting element OLED are disposed on the base layer 110. Although FIG. 8 illustrates one transistor TR, the pixel PX may substantially include a plurality of transistors and at least one capacitor that drive the light emitting element OLED.

The display area DA includes a light emitting area LA that corresponds to each of the pixels PX and a non-light emitting area NLA adjacent to the light emitting area LA. The light emitting element OLED is disposed in the light emitting area LA.

A buffer layer BFL is disposed on the base layer 110, and the buffer layer BFL is an inorganic layer. The semiconductor pattern is disposed on the buffer layer BFL. The semiconductor pattern includes at least one of polysilicon, amorphous silicon, or a metal oxide.

The semiconductor pattern may be doped with an N-type dopant or a P-type dopant. The semiconductor pattern includes a high-doped area and a low-doped area. Conductivity of the high-doped area is higher than that of the low-doped area, and the high-doped area serves as a source electrode and a drain electrode of the transistor TR. The low-doped area corresponds to an active area (or a channel) of a transistor.

A source area S, an active area A, and a drain area D of the transistor TR are formed from the semiconductor pattern. A first insulating layer INS1 is disposed on the semiconductor pattern and the buffer layer BFL. A gate G of the transistor TR is disposed on the first insulating layer INS1. A second insulating layer INS2 is disposed on the gate G and the first insulating layer INS1. A third insulating layer INS3 is disposed on the second insulating layer INS2.

A connection electrode CNE includes a first connection electrode CNE1 and a second connection electrode CNE2 that connect the transistor TR and the light emitting element OLED. The first connection electrode CNE1 is disposed on the third insulating layer INS3 and is connected to the drain area D through a first contact hole CH1 that penetrates the first to third insulating layers INS1 to INS3.

A fourth insulating layer INS4 is disposed on the first connection electrode CNE1 and the third insulating layer INS3. A fifth insulating layer INS5 is disposed on the fourth insulating layer INS4. The second connection electrode CNE2 is disposed on the fifth insulating layer INS5. The second connection electrode CNE2 is connected to the first connection electrode CNE1 through a second contact hole CH2 that penetrates the fourth and fifth insulating layers INS4 and INS5.

A sixth insulating layer INS6 is disposed on the second connection electrode CNE2 and the fifth insulating layer INS5. The layers from the buffer layer BFL to the sixth insulating layer INS6 may be defined as the circuit layer 120. The first insulating layer INS1 to the sixth insulating layer INS6 may be inorganic layers or organic layers.

The first electrode AE is disposed on the sixth insulating layer INS6. The first electrode AE is connected to the second connection electrode CNE2 through a third contact hole CH3 that penetrates the sixth insulating layer INS6. A pixel defining film PDL that includes an opening PX_OP that exposes a predetermined portion of the first electrode AE is disposed on the first electrode AE and the sixth insulating layer INS6.

The hole control layer HCL is disposed on the first electrode AE and the pixel defining film PDL. The hole control layer HCL includes a hole transport layer and a hole injection layer.

The light emitting layer EML is disposed on the hole control layer HCL. The light emitting layer EML is disposed in an area that corresponds to the opening PX_OP. The light emitting layer EML may include an organic material and/or an inorganic material. The light emitting layer EML generates light that is one of red, green, or blue.

The electron control layer ECL is disposed on the light emitting layer EML and the hole control layer HCL. The electron control layer ECL includes an electron transport layer and an electron injection layer. The hole control layer HCL and the electron control layer ECL are commonly arranged in the light emitting area LA and the non-light emitting area NLA.

The second electrode CE is disposed on the electron control layer ECL. The second electrode CE is commonly disposed in the pixels PX. The layers of the light emitting element OLED and the pixel defining film PDL may be defined as the light emitting element layer 130.

The encapsulation layer 140 is disposed on the second electrode CE and covers the pixels PX. The encapsulation layer 140 include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 include inorganic insulating layers and protect the pixel PX from moisture/oxygen. The second encapsulation layer EN2 includes an organic insulating layer and protects the pixel PX from foreign substances such as dust particles.

A first voltage is applied to the first electrode AE through the transistor TR, and a second voltage that is lower than the first voltage is applied to the second electrode CE. Holes and electrons injected into the light emitting layer EML are coupled to each other to form excitons, and as the excitons transition to a ground state, the light emitting element OLED emits light.

The sensor layer 200 is disposed on the encapsulation layer 140. The sensor layer 200 is directly disposed on an upper surface of the encapsulation layer 140.

A base layer BSL is disposed on the encapsulation layer 140. The base layer BSL includes at least one inorganic insulating layer.

The sensor layer 200 includes a first conductive pattern CTL1 and a second conductive pattern CTL2 disposed on the first conductive pattern CTL1. The first conductive pattern CTL1 is disposed on the base layer BSL. An insulating layer TINS is disposed on the base layer BSL and covers the first conductive pattern CTL1. The insulating layer TINS may include an inorganic insulating layer or an organic insulating layer. The second conductive pattern CTL2 is disposed on the insulating layer TINS.

The first and second conductive patterns CTL1 and CTL2 overlap the non-light emitting area NLA. In addition, the first and second conductive patterns CTL1 and CTL2 are arranged in the non-light emitting area NLA between the light emitting areas LA and have a mesh shape.

The first and second conductive patterns CTL1 and CTL2 form sensing electrodes and pen sensing electrodes of the sensor layer 200. For example, the first and second conductive patterns CTL1 and CTL2 have a mesh shape and are separated from each other in a predetermined area to form the sensing electrodes and the pen sensing electrodes. A portion of the second conductive pattern CTL2 is connected to the first conductive pattern CTL1.

The optical layer OPL is disposed on the second conductive pattern CTL2 and the insulating layer TINS. The optical layer OPL includes a black matrix BM and a plurality of color filters CF. The black matrix BM overlaps the non-light emitting area NLA, and the color filters CF overlap the light emitting areas LA.

The black matrix BM is disposed on the insulating layer TINS and covers the second conductive pattern CTL2. An opening B_OP that that overlaps the light emitting area LA and the opening PX_OP is formed in the black matrix BM.

The black matrix BM absorbs and blocks light. A width of the opening B_OP is greater than a width of the opening PX_OP.

The color filters CF are disposed on the insulating layer TINS and the black matrix BM. The color filters CF are arranged in the openings B_OP. A planarization insulating layer PINS is disposed on the color filters CF. The planarization insulating layer PINS provides a flat upper surface. The planarization insulating layer PINS includes an organic insulating layer.

When external light propagating toward the display layer 100 is reflected by the display layer 100 back to an external user, the user may perceive the external light beam. To prevent this phenomenon, the optical layer OPL includes the plurality of color filters CF that display the same colors as those of the pixels PX of the display layer 100. The color filters CF filter the external light into the same colors as those of the pixels PX. For example, the external light is not perceived by the user.

Figure 10:
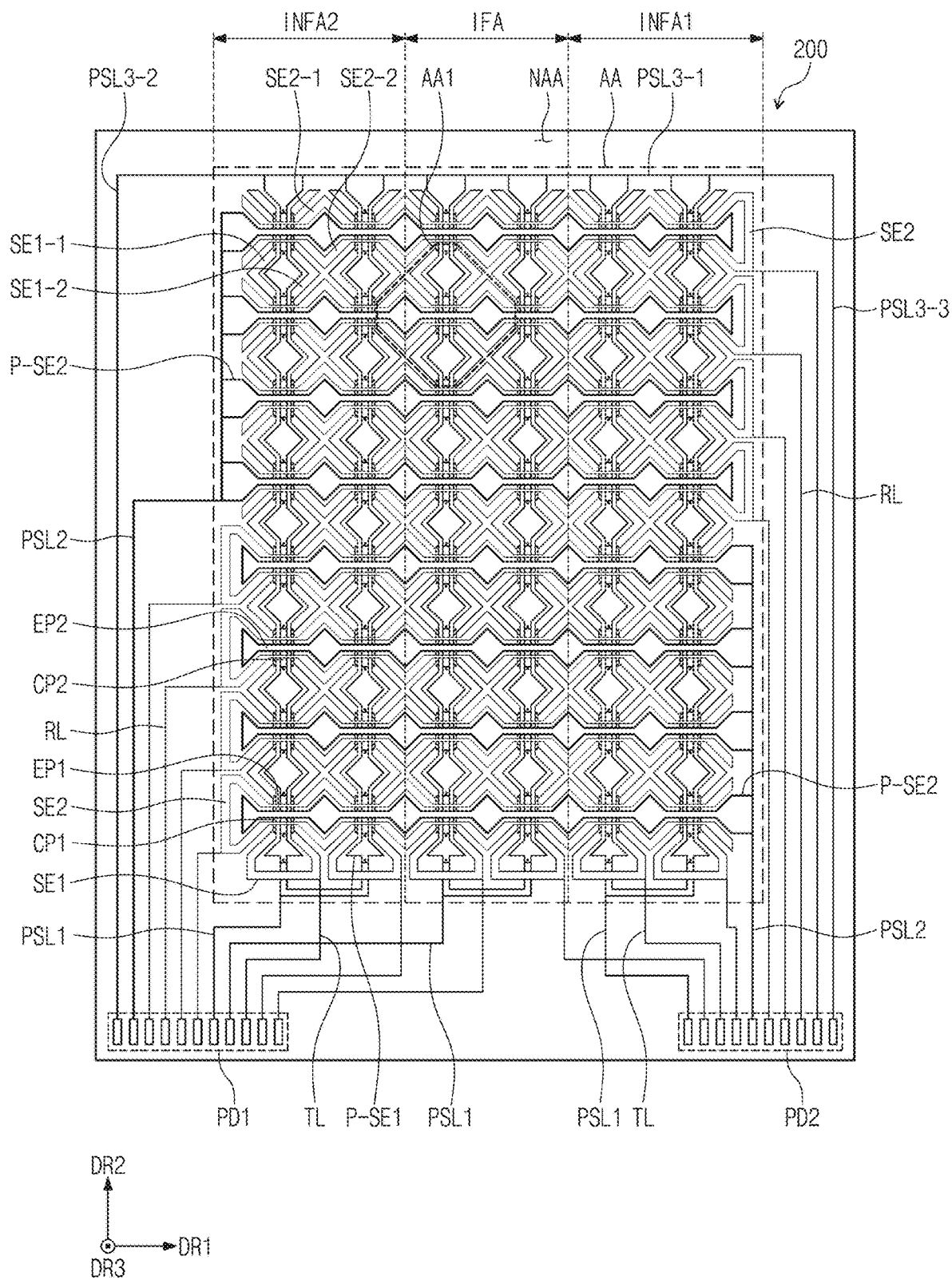
FIG. 10 is a plan view of a sensor layer according to an embodiment of the present disclosure.

FIG. 10 is a plan view of a sensor layer according to an embodiment of the present disclosure.

Referring to FIG. 10, in an embodiment, the sensor layer 200 includes a plurality of sensing electrodes SE1 and SE2, a plurality of sensing wiring lines TL and RL, a plurality of pen sensing electrodes P-SE1 and P-SE2, a plurality of pen sensing wiring lines PSL1, PSL2, and PSL3-1 to PSL3-3, and a plurality of first and second pads PD1 and PD2. The sensing electrodes SE1 and SE2, the sensing wiring lines TL and RL, the pen sensing electrodes P-SE1 and P-SE2, and the pen sensing wiring lines PSL1, PSL2, and PSL3-1 to PSL3-3 are arranged on the encapsulation layer 140.

The sensor layer 200 includes an active area AA and a non-active area NAA around the active area AA. When viewed in a plan view, the active area AA overlaps the display area DA (see FIG. 1), and the non-active area NAA overlaps the peripheral area NA (see FIG. 1).

The active area AA includes a foldable area IFA and a first non-foldable area INFA1 and a second non-foldable area INFA2 spaced apart from each other in the first direction DR1 with the foldable area IFA interposed therebetween. The foldable area IFA overlaps the foldable area FA (see FIG. 1) of the display layer 100 (see FIG. 5), the first non-foldable area INFA1 overlaps the first non-foldable area NFA1 (see FIG. 1) of the display layer 100 (see FIG. 5), and the second non-foldable area INFA2 overlaps the second non-foldable area NFA2 (see FIG. 1) of the display layer 100 (see FIG. 5).

The sensing electrodes SE1 and SE2 are arranged in the active area AA, and the first and second pads PD1 and PD2 are arranged in the non-active area NAA. The first pads PD1 and the second pads PD2 are adjacent to a lower end of the sensor layer 200 when viewed in a plan view. However, embodiments are not necessarily limited thereto, and in some embodiments, positions of the first pads PD1 and the second pads PD2 differ, or the first pads PD1 and the second pads PD2 are omitted.

The sensing electrodes SE1 and SE2 include a plurality of first sensing electrodes SE1 that extend in the second direction DR2 and are spaced apart in the first direction DR1, and a plurality of second sensing electrodes SE2 that extend in the first direction DR1 and are spaced apart in the second direction DR2. The second sensing electrodes SE2 are insulated from and cross the first sensing electrodes SE1. The first and second sensing electrodes SE1 and SE2 sense the first input.

The sensing wiring lines TL and RL are connected to ends of the first and second sensing electrodes SE1 and SE2, extend to the non-active area NAA, and are connected to the first and second pads PD1 and PD2. The sensing wiring lines TL and RL include a plurality of first sensing wiring lines TL connected to the first sensing electrodes SE1 and a plurality of second sensing wiring lines RL connected to the second sensing electrodes SE2.

The first sensing wiring lines TL are connected to lower ends of the first sensing electrodes SE1. The first sensing wiring lines TL extend to the non-active area NAA and are connected to the corresponding first and second pads PD1 and PD2.

The second sensing wiring lines RL are connected to left ends or right ends of the second sensing electrodes SE2. The second sensing wiring lines RL extend to the non-active area NAA and are connected to the corresponding first and second pads PD1 and PD2.

Each of the first sensing electrodes SE1 includes a $(1-1)^{th}$ sensing electrode SE1-1 and a $(1-2)^{th}$ sensing electrode SE1-2 that extend in the second direction DR2 and are spaced apart from each other in the first direction DR1. The $(1-1)^{th}$ sensing electrode SE1-1 and the $(1-2)^{th}$ sensing electrode SE1-2 are symmetric to each other in the first direction DR1 with respect to an axis parallel to the second direction DR2.

In each of the first sensing electrodes SE1, a lower end of the $(1-1)^{th}$ sensing electrode SE1-1 and a lower end of the $(1-2)^{th}$ sensing electrode SE1-2 is connected to a corresponding first sensing wiring line TL. In each of the first sensing electrodes SE1, an upper end of the $(1-1)^{th}$ sensing electrode SE1-1 and an upper end of the $(1-2)^{th}$ sensing electrode SE1-2 are not connected to each other.

Each of the second sensing electrodes SE2 includes a $(2-1)^{th}$ sensing electrode SE2-1 and a $(2-2)^{th}$ sensing electrode SE2-2 that extend in the first direction DR1 and are spaced apart from each other in the second direction DR2. The $(2-1)^{th}$ sensing electrode SE2-1 and the $(2-2)^{th}$ sensing electrode SE2-2 are symmetric to each other with respect to an axis parallel to the first direction DR1.

Some of the second sensing electrodes SE2 are arranged under the sensor layer 200, and the remaining second sensing electrodes SE2 are arranged on the sensor layer 200. In each of the second sensing electrodes SE2 arranged under the sensor layer 200, a left end of the $(2-1)^{th}$ sensing electrode SE2-1 and a left end of the $(2-2)^{th}$ sensing electrode SE2-2 are connected to corresponding second sensing wiring lines RL. In each of the second sensing electrodes SE2 arranged under the sensor layer 200, a right end of the $(2-1)^{th}$ sensing electrode SE2-1 and a right end of the $(2-2)^{th}$ sensing electrode SE2-2 are not connected to each other.

In each of the second sensing electrodes SE2 arranged on the sensor layer 200, the right end of the $(2-1)^{th}$ sensing electrode SE2-1 and the right end of the $(2-2)^{th}$ sensing electrode SE2-2 are connected to corresponding second sensing wiring lines RL. In each of the second sensing electrodes SE2 arranged on the sensor layer 200, the left end of the $(2-1)^{th}$ sensing electrode SE2-1 and the left end of the $(2-2)^{th}$ sensing electrode SE2-2 are not connected to each other.

When viewed in a plan view, the first sensing wiring lines TL are arranged in the non-active area NAA adjacent to a lower side of the active area AA. Further, when viewed in a plan view, the second sensing wiring lines RL are arranged in the non-active area NAA adjacent to a left side and a right side of the active area AA.

The pen sensing electrodes P-SE1 and P-SE2 are arranged in the active area AA. The pen sensing wiring lines PSL1, PSL2, and PSL3-1 to PSL3-3 are connected to the pen sensing electrodes P-SE1 and P-SE2, extend to the non-active area NAA, and are connected to corresponding first and second pads PD1 and PD2.

The sensor driving unit 200C (see FIG. 5) is connected to the first and second pads PD1 and PD2 through a printed circuit board.

The pen sensing electrodes P-SE1 and P-SE2 includes a plurality of first pen sensing electrodes P-SE1 that extend in the second direction DR2 and are spaced apart in the first direction DR1, and a plurality of second pen sensing electrodes P-SE2 that extend in the first direction DR1 and are spaced apart in the second direction DR2. The first and second pen sensing electrodes P-SE1 and P-SE2 sense the second input.

The second pen sensing electrodes P-SE2 are insulated from and cross the first pen sensing electrodes P-SE1. The first pen sensing electrodes P-SE1 are insulated from and cross the second sensing electrodes SE2. The second pen sensing electrodes P-SE2 are insulated from and cross the first sensing electrodes SE1.

Each of the first pen sensing electrodes P-SE1 is disposed between a $(1-1)^{th}$ sensing electrode SE1-1 and a $(1-2)^{th}$ sensing electrode SE1-2 of a corresponding first sensing electrode SE1. Each of the second pen sensing electrodes P-SE2 is disposed between a $(2-1)^{th}$ sensing electrode SE2-1 and a $(2-2)^{th}$ sensing electrode SE2-2 of a corresponding second sensing electrode SE2.

The first pen sensing electrodes P-SE1 are arranged on the same layer as the first sensing electrodes SE1. The second pen sensing electrodes P-SE2 are arranged on the same layer as the second sensing electrodes SE2. For example, some of the second pen sensing electrodes P-SE2 are arranged under the sensor layer 200, and the remaining second pen sensing electrodes P-SE2 are arranged on the sensor layer 200. In an embodiment, the first pen sensing electrodes P-SE1, the first sensing electrodes SE1, the second pen sensing electrodes P-SE2, and the second sensing electrodes SE2 are all arranged on the same layer.

Upper ends of the first pen sensing electrodes P-SE1 are connected to each other. Lower ends of the first pen sensing electrodes P-SE1 are connected to each other in pairs. Left ends of the second pen sensing electrodes P-SE2 arranged on the sensor layer 200 are connected to each other. Right ends of the second pen sensing electrodes P-SE2 arranged under the sensor layer 200 are connected to each other.

Right ends of the second pen sensing electrodes P-SE2 arranged on the sensor layer 200 are not connected to each other. Left ends of the second pen sensing electrodes P-SE2 arranged under the sensor layer 200 are not connected to each other.

The pen sensing wiring lines PSL1, PSL2, and PSL3-1 to PSL3-3 include a plurality of first pen sensing wiring lines PSL1, a plurality of second pen sensing wiring lines PSL2, and a plurality of $(3-1)^{th}$, $(3-2)^{th}$, and $(3-3)^{th}$ pen sensing wiring lines PSL3-1, PSL3-2, and PSL3-3. The first pen sensing wiring lines PSL1 and the $(3-1)^{th}$, $(3-2)^{th}$, and $(3-3)^{th}$ pen sensing wiring lines PSL3-1, PSL3-2, and PSL3-3 are connected to the first pen sensing electrodes P-SE1. The second pen sensing wiring lines PSL2 are connected to the second pen sensing electrodes P-SE2.

The pair of first pen sensing electrodes P-SE1, of which lower ends are connected to each other, are connected to a corresponding first pen sensing wiring line PSL1. Upper ends of the first pen sensing electrodes P-SE1 are connected to the $(3-1)^{th}$ pen sensing wiring line PSL3-1 that extends in the first direction DR1.

The $(3-2)^{th}$ pen sensing wiring line PSL3-2 and the $(3-3)^{th}$ pen sensing wiring line PSL3-3 extend in the second direction DR2 from both ends of the $(3-1)^{th}$ pen sensing wiring line PSL3-1. The $(3-2)^{th}$ pen sensing wiring line PSL3-2 and the $(3-3)^{th}$ pen sensing wiring line PSL3-3 are connected to a corresponding first pad PD1 and a corresponding second pad PD2, respectively.

The left ends of the second pen sensing electrodes P-SE2 arranged on the sensor layer 200 are connected to a corresponding second pen sensing wiring line PSL2. The second pen sensing wiring line PSL2 connected to the second pen sensing electrodes P-SE2 arranged on the sensor layer 200 are connected to a corresponding first pad PD1.

The right ends of the second pen sensing electrodes P-SE2 arranged under the sensor layer 200 are connected to a corresponding second pen sensing wiring line PSL2. The second pen sensing wiring line PSL2 connected to the second pen sensing electrodes P-SE2 arranged under the sensor layer 200 are connected to a corresponding second pad PD2.

The sensor layer 200 is driven in a time division manner and includes a first sensing period and a second sensing period. The first sensing period and the second sensing period are repeated. During the first sensing period, the first and second sensing electrodes SE1 and SE2 are driven to sense the first input by a user's touch FN (see FIG. 5). During the second sensing period, the first and second pen sensing electrodes P-SE1 and P-SE2 are driven to sense the second input by the input device PN (see FIG. 5). An operation of sensing the second input by the input device PN (see FIG. 5) will be described below in detail.

According to embodiments of the present disclosure, since the first input by the user's touch FN (see FIG. 5) and the second input by the input device PN (see FIG. 5) are performed by the same sensor layer 200, two input devices, such as a touch panel and a digitizer, are not used, and thus a thickness of the electronic device 1000 (see FIG. 1) can be reduced.

Although FIG. 10 illustrates six first pen sensing electrodes P-SE1 and eight second pen sensing electrodes P-SE2, embodiments are not necessarily limited thereto, and the sensor layer 200 may substantially include more first pen sensing electrodes P-SE1 and more second pen sensing electrodes P-SE2.

Figure 11:
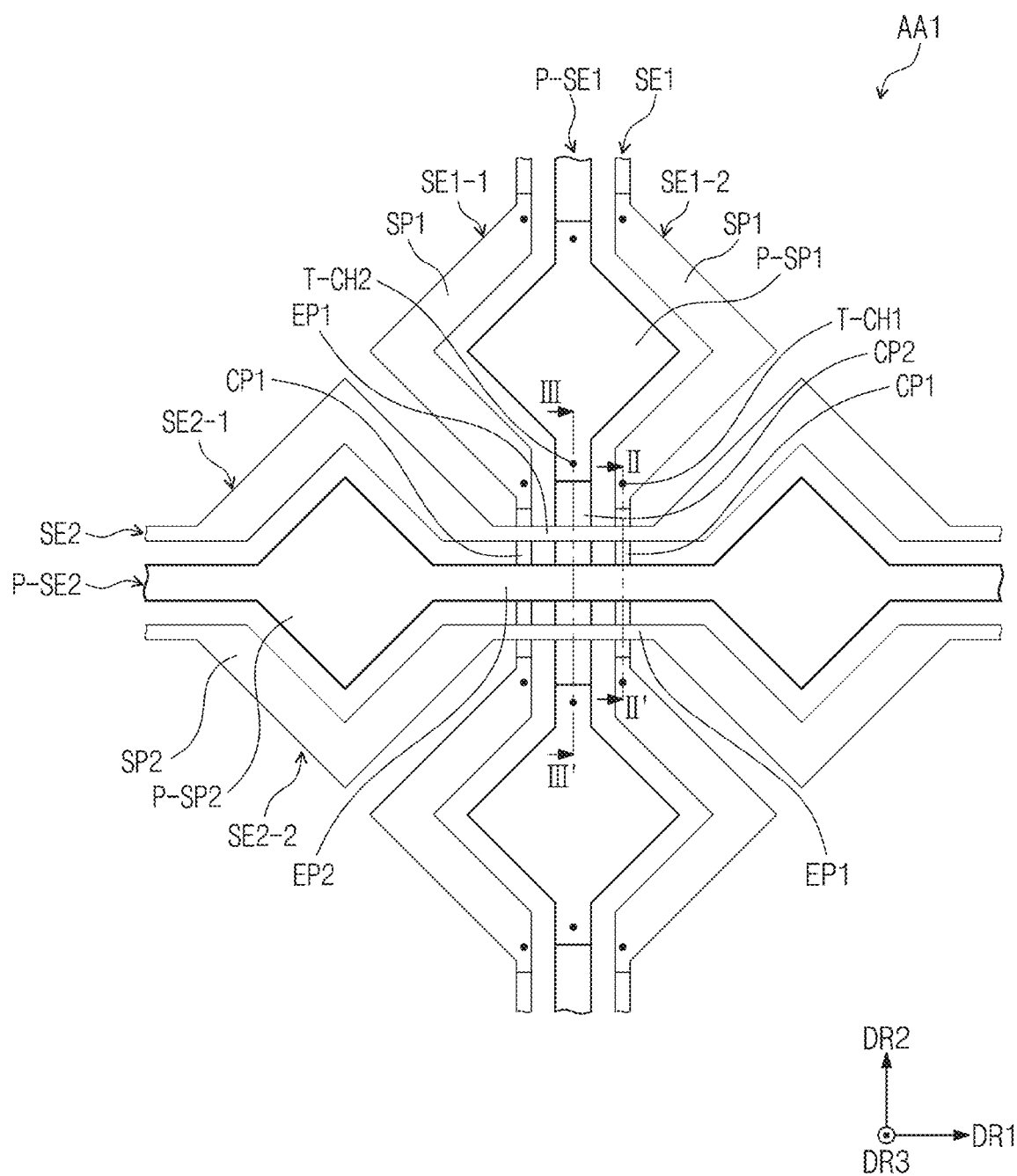
FIG. 11 is an enlarged plan view of area AA1 of FIG. 10 according to an embodiment of the present disclosure.

FIG. 11 is an enlarged plan view of area AAl of FIG. 10 according to an embodiment of the present disclosure.

Referring to FIGS. 10 and 11, in an embodiment, each of the $(1-1)^{th}$ and $(1-2)^{th}$ sensing electrodes SE1-1 and SE1-2 includes a plurality of first sensing units SP1 that extend in the second direction DR2 and a plurality of first connection patterns CP1 that connect the first sensing units SP1.

The first sensing units SP1 have a bent shape. For example, the first sensing units SP1 of the $(1-1)^{th}$ sensing electrode SE1-1 and first sensing units SP1 of the $(1-2)^{th}$ sensing electrode SE1-2 are bent outward.

The first connection patterns CP1 extend in the second direction DR2, are arranged between the first sensing units SP1, and are connected to the first sensing units SP1. The first sensing units SP1 are connected to each other through the first connection patterns CP1.

Each of the first connection patterns CP1 is disposed between two adjacent first sensing units SP1 and connects the two first sensing units SP1. Insulating layers TINS (see FIG. 13) are disposed between the first connection patterns CP1 and the first sensing units SP1, and the first connection patterns CP1 are connected to the first sensing units SP1 through first contact holes T-CH1 formed in the insulating layers TINS (see FIG. 13).

Each of the $(2-1)^{th}$ and $(2-2)^{th}$ sensing electrodes SE2-1 and SE2-2 includes a plurality of second sensing units SP2 that extend in the first direction DR1 and a plurality of first extension patterns EP1 that extend from and connect the second sensing units SP2 in the first direction DR1. When viewed in a plan view, the first extension patterns EP1 cross the first connection patterns CP1.

The second sensing units SP2 have a bent shape. For example, the second sensing units SP2 of the $(2-1)^{th}$ sensing electrode SE2-1 and the second sensing units SP2 of the $(2-2)^{th}$ sensing electrode SE2-2 are bent outward.

In each of the $(2-1)^{th}$ and $(2-2)^{th}$ sensing electrodes SE2-1 and SE2-2, the first extension patterns EP1 are integrally formed with the second sensing units SP2. Each of the first extension patterns EP1 is disposed between two adjacent second sensing units SP2 and may extend from and connect the two second sensing units SP2.

The first sensing units SP1 and the second sensing units SP2 are spaced apart from each other while not overlapping each other and are alternately arranged. A capacitance is formed by the first sensing units SP1 and the second sensing units SP2.

The first and second sensing units SP1 and SP2 and the first extension patterns EP1 are disposed on the same layer. The first connection patterns CP1 are disposed on a different layer from the first and second sensing units SP1 and SP2 and the first extension patterns EP1. The first connection patterns CP1 are disposed under the first and second sensing units SP1 and SP2 and the first extension patterns EP1.

Each of the first pen sensing electrodes P-SE1 includes a plurality of first pen sensing units P-SP1 that extend in the second direction DR2, and a plurality of second connection patterns CP2 that connect the first pen sensing units P-SP1.

The first pen sensing units P-SP1 have a diamond shape, but the shape of the first pen sensing units P-SP1 is not necessarily limited thereto. The second connection patterns CP2 extend in the second direction DR2, are arranged between adjacent first pen sensing units P-SP1, and are connected to the first pen sensing units P-SP1. The first pen sensing units P-SP1 are connected to each other through the second connection patterns CP2.

Each of the second connection patterns CP2 is disposed between two adjacent first pen sensing units P-SP1 and connects the two first pen sensing units P-SP1. Insulating layers TINS (See FIG. 14) are disposed between the second connection patterns CP2 and the first pen sensing units P-SP1, and the second connection patterns CP2 are connected to the first pen sensing units P-SP1 through second contact holes T-CH2 that penetrate the insulating layers TINS (see FIG. 14).

Each of the second pen sensing electrodes P-SE2 includes a plurality of second pen sensing units P-SP2 that extend in the first direction DR1 and a plurality of second extension patterns EP2 that extend from and connect the second pen sensing units P-SP2 in the first direction DR1. When viewed in a plan view, the first and second extension patterns EP1 and EP2 cross the first and second connection patterns CP1 and CP2.

The second pen sensing units P-SP2 have a diamond shape, but the shape of the second pen sensing units P-SP2 is not necessarily limited thereto. The second extension patterns EP2 are integrally formed with the second pen sensing units P-SP2. Each of the second extension patterns EP2 is disposed between two adjacent second pen sensing units P-SP2 and extends from and connects the two second pen sensing units P-SP2.

The first pen sensing units P-SP1, the second pen sensing units P-SP2, and the second extension patterns EP2 are disposed on the same layer as the first and second sensing units SP1 and SP2 and the first extension patterns EP1. The second connection patterns CP2 are disposed on the same layer as the first connection patterns CP1.

The first sensing wiring lines TL and the first pen sensing wiring lines PSL1 are insulated from and cross each other. For example, the first sensing wiring lines TL are integrally formed with the first sensing units SP1 adjacent to the lower side of the active area AA and extend from the first sensing units SP1. The first pen sensing wiring lines PSL1 are integrally formed with the second connection patterns CP2 adjacent to the lower side of the active area AA and extend from the second connection patterns CP2.

The first pen sensing wiring lines PSL1 are arranged below the first sensing wiring lines TL. Insulating layers are disposed between the first pen sensing wiring lines PSL1 and the first sensing wiring lines TL.

Figure 12:
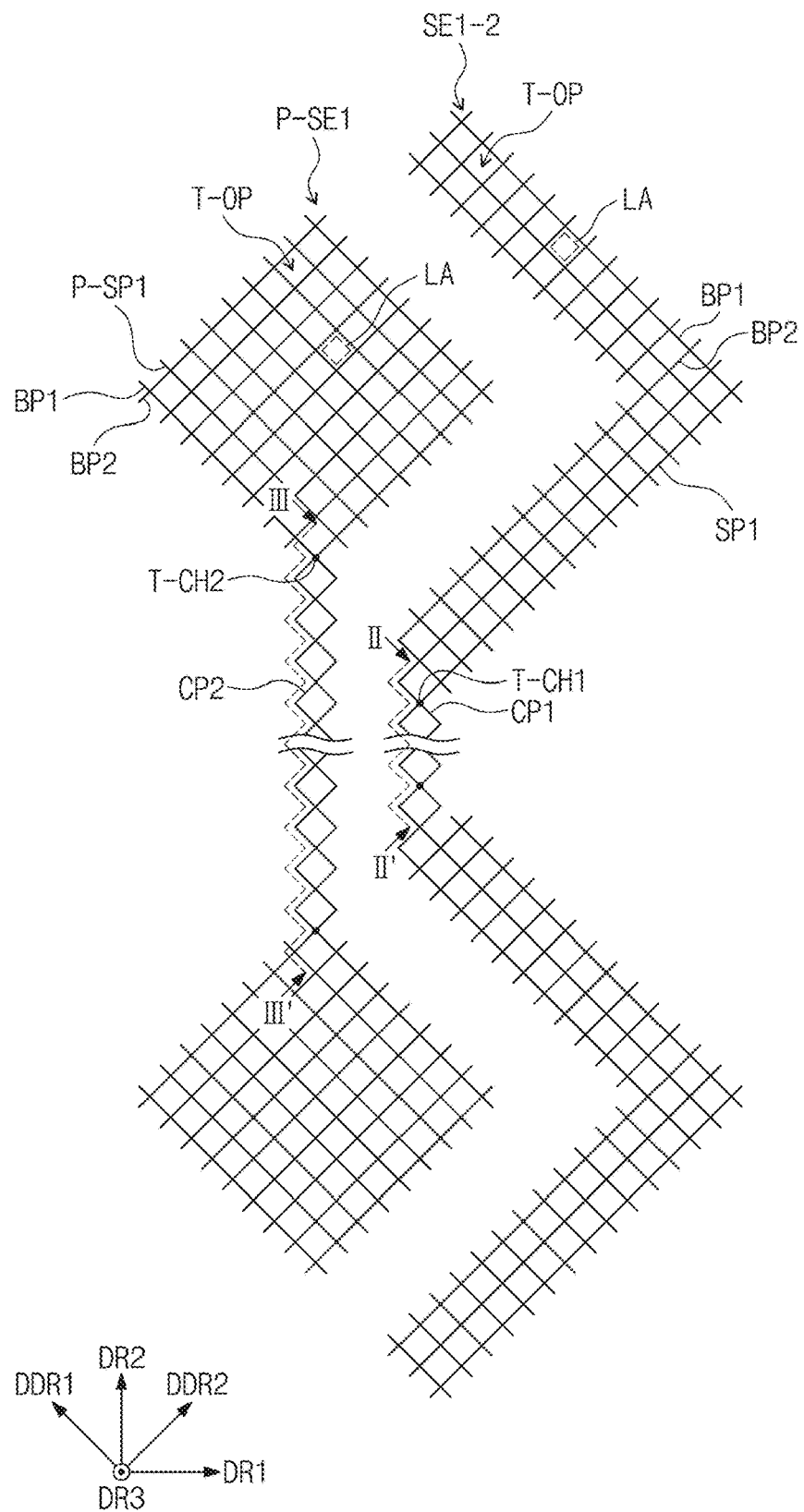
FIG. 12 is a plan view of a first pen sensing electrode and a $(1-2)^{th}$ sensing electrode according to an embodiment of the present disclosure.

FIG. 12 is a plan view of a detailed configuration of a first pen sensing electrode and a $(1-2)^{th}$ sensing electrode according to an embodiment of the present disclosure.

Referring to FIG. 12, in an embodiment, the first pen sensing electrode P-SE1 and the $(1-2)^{th}$ sensing electrode SE1-2 have a mesh shape. For example, each of the first pen sensing electrode P-SE1 and the $(1-2)^{th}$ sensing electrode SE1-2 includes a plurality of first branch parts BP1 that extend in a first diagonal direction DDR1 and a plurality of second branch parts BP2 that extend in a second diagonal direction DDR2.

The first diagonal direction DDR1 may be defined as a direction that crosses the first and second directions DR1 and DR2 in a plane defined by the first and second directions DR1 and DR2. The second diagonal direction DDR2 may be defined as a direction that crosses the first diagonal direction DDR1 in a plane defined by the first and second directions DR1 and DR2.

The first and second branch parts BP1 and BP2 intersect each other and are integrally formed. The mesh shapes of the first pen sensing electrode P-SE1 and the $(1-2)^{th}$ sensing electrode SE1-2 are formed by the first and second branch parts BP1 and BP2.

Diamond-shaped openings T-OP are formed by the first and second branch parts BP1 and BP2. The light emitting areas LA of the pixels PX are arranged in the diamond-shaped openings T-OP. Thus, the first and second branch parts BP1 and BP2 overlap the non-light emitting area NLA. For example, the $(1-2)^{th}$ sensing electrode SE1-2 and the first pen sensing electrode P-SE1 overlap the non-light emitting area NLA.

Since the first and second branch parts BP1 and BP2 are arranged in the non-light emitting area NLA, light generated by the light emitting elements OLED of the pixels PX can be emitted without being affected by the $(1-2)^{th}$ sensing electrode SE1-2 and the first pen sensing electrode P-SE1.

Figure 13:
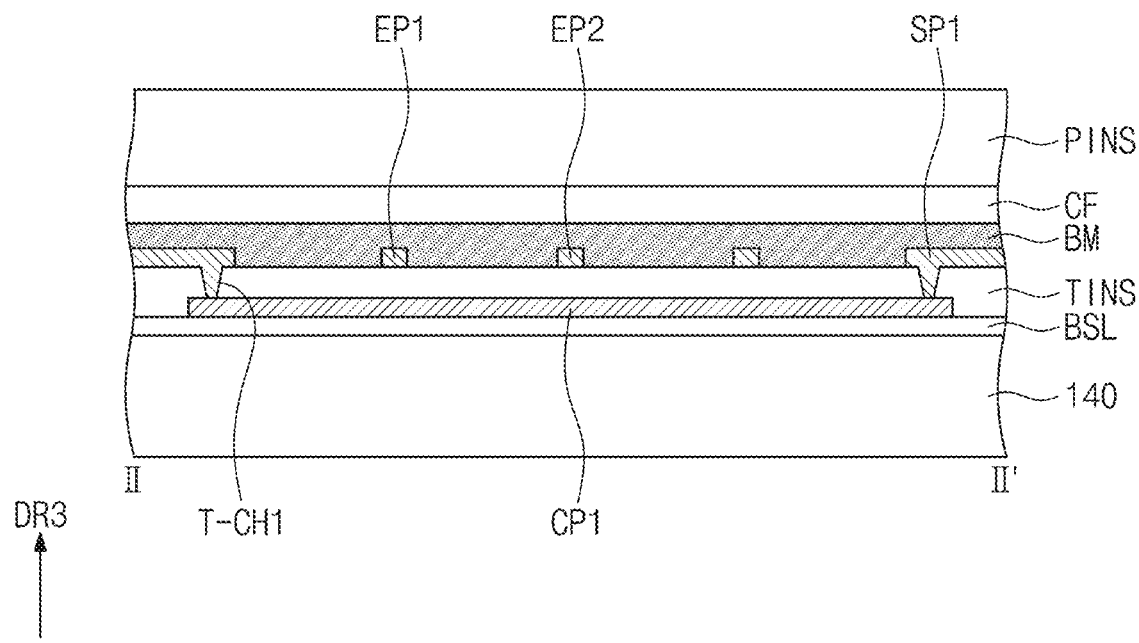
FIG. 13 is a cross-sectional view taken along line II-II' of FIGS. 11 and 12 according to an embodiment of the present disclosure.
Figure 14:
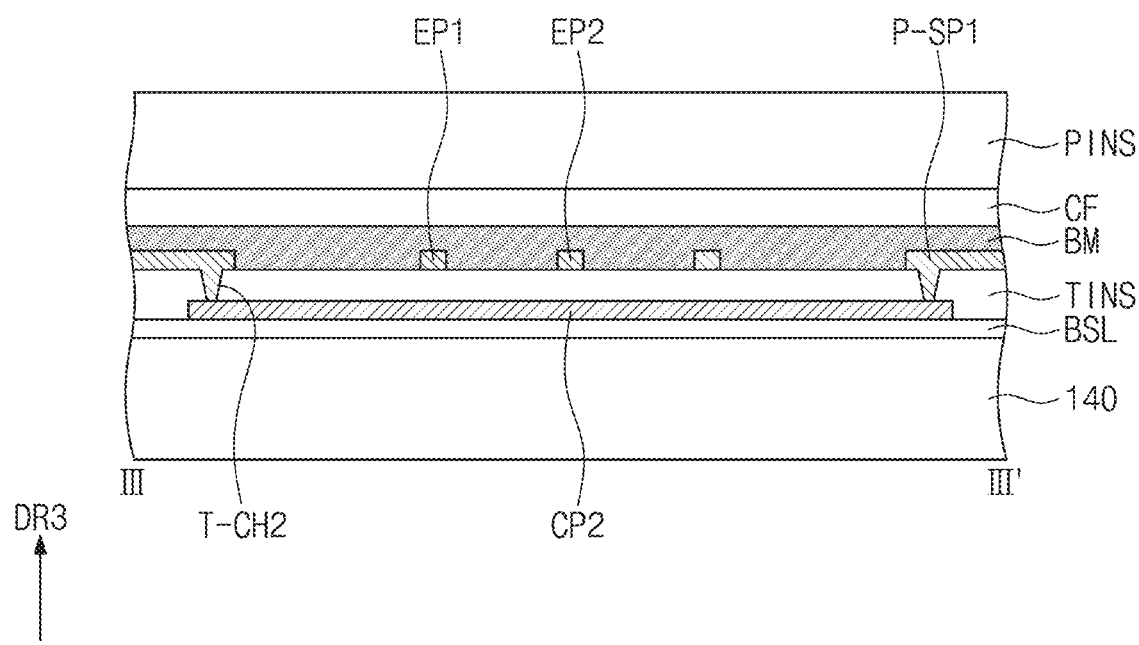
FIG. 14 is a cross-sectional view taken along line III-III' of FIGS. 11 and 12 according to an embodiment of the present disclosure.

FIG. 13 is a cross-sectional view along line II-II' of FIGS. 11 and 12 according to an embodiment of the present disclosure, and FIG. 14 is a cross-sectional view along line III-III' of FIGS. 11 and 12 according to an embodiment of the present disclosure.

Referring to FIGS. 13 and 14, in an embodiment, the base layer BSL is disposed on the encapsulation layer 140, and the first connection pattern CP1 and the second connection pattern CP2 are disposed on the base layer BSL. The first connection pattern CP1 and the second connection pattern CP2 are formed by the first conductive pattern CTL1 described above.

The insulating layer TINS is disposed on the base layer BSL and covers the first and second connection patterns CP1 and CP2. The first sensing units SP1, the first pen sensing units P-SP1, and the first and second extension patterns EP1 and EP2 are disposed on the insulating layer TINS. In addition, the second sensing units SP2 that are integrally formed with the first extension patterns EP1 and the second pen sensing units P-SP2 that are integrally formed with the second extension patterns EP2 are also disposed on the insulating layer TINS.

The first sensing units SP1 are connected to the first connection pattern CP1 through the first contact holes T-CH1 formed in the insulating layer TINS. The first pen sensing units P-SP1 are connected to the second connection pattern CP2 through the second contact holes T-CH2 formed in the insulating layer TINS.

The black matrix BM is disposed on the insulating layer TINS and covers the first sensing units SP1, the first pen sensing units P-SP1, and the first and second extension patterns EP1 and EP2. The color filter CF is disposed on the black matrix BM, and the planarization insulating layer PINS is disposed on the color filter CF.

Figure 15:
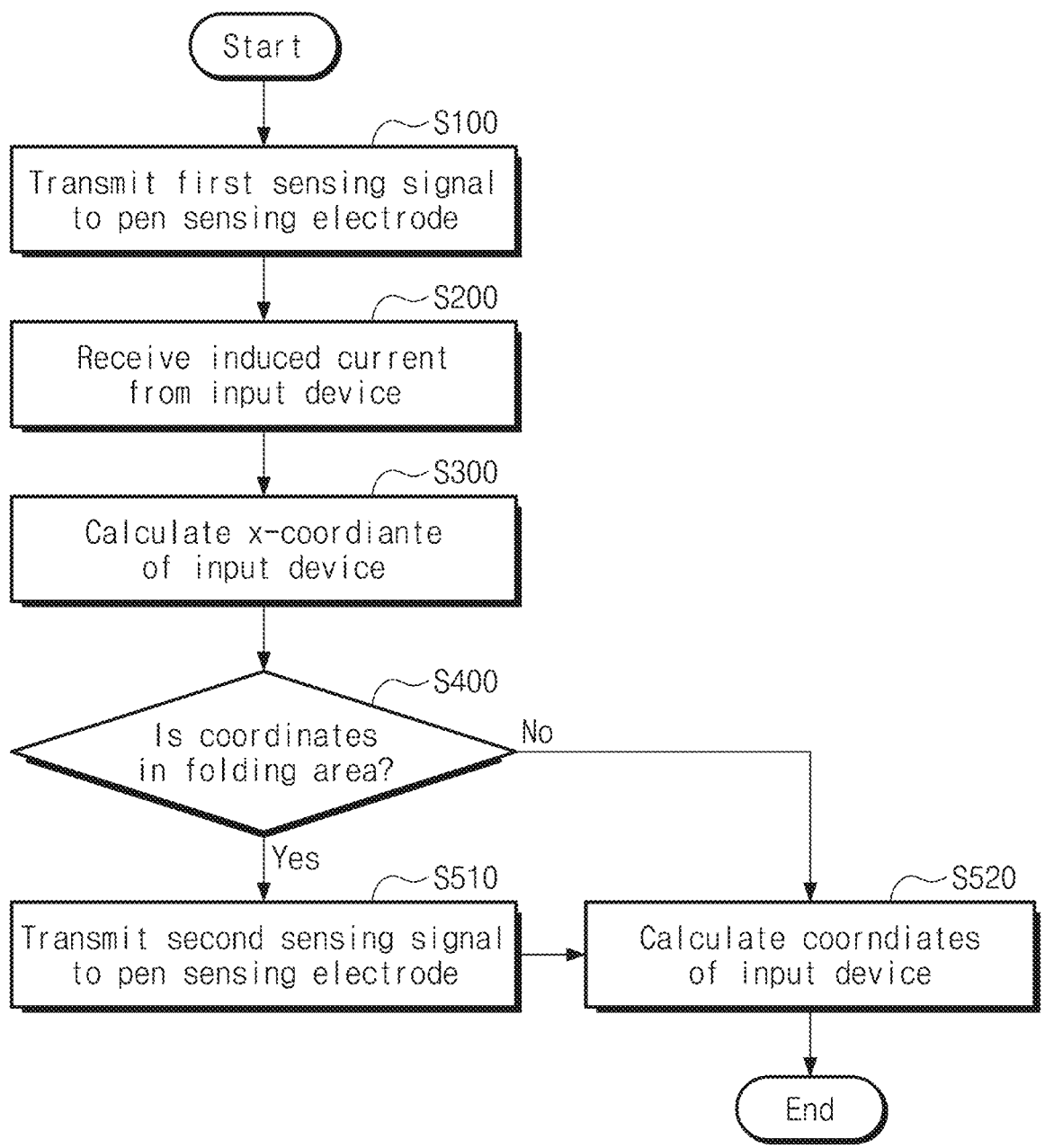
FIG. 15 is a flowchart of a method of driving a sensor driving unit according to an embodiment of the present disclosure.

FIG. 15 is a flowchart of a method of driving a sensor driving unit according to an embodiment of the present disclosure.

Referring to FIGS. 5 and 15, in an embodiment, the sensor driving unit 200C transmits a first sensing signal SS1 (see FIG. 16) to the first pen sensing electrode P-SE1 (S100).

The sensor layer 200 receives a first induced current IC1 (see FIG. 19) from the input device PN (S200).

The sensor driving unit 200C calculates an x-coordinate of the input device PN based on the first induced current IC1 (see FIG. 19) (S300).

The sensor driving unit 200C determines whether the x-coordinate is in the foldable area IFA (see FIG. 10) (S400).

When the x-coordinate is in the foldable area IFA (see FIG. 10), the sensor driving unit 200C transmits, to the first pen sensing electrode P-SE1, a second sensing signal SS2 (see FIG. 17) that has a driving frequency that differs from that of the first sensing signal SS1 (see FIG. 16) (S510). The input device PN can be charged based on the second sensing signal SS2 (see FIG. 17). The charged input device PN generates magnetic flux as it is discharged, and the magnetic flux forms a first induced current IC1 (see FIG. 19) and a second induced current IC2 (see FIG. 19). Thereafter, the sensor driving unit 200C calculates coordinates of the input device PN based on the first induced current IC1 (see FIG. 19) and a second induced current IC2 (see FIG. 19) (S520).

The first sensing signal SS1 (see FIG. 16) and the second sensing signal SS2 (see FIG. 17) may be referred to as driving currents.

Figure 16:
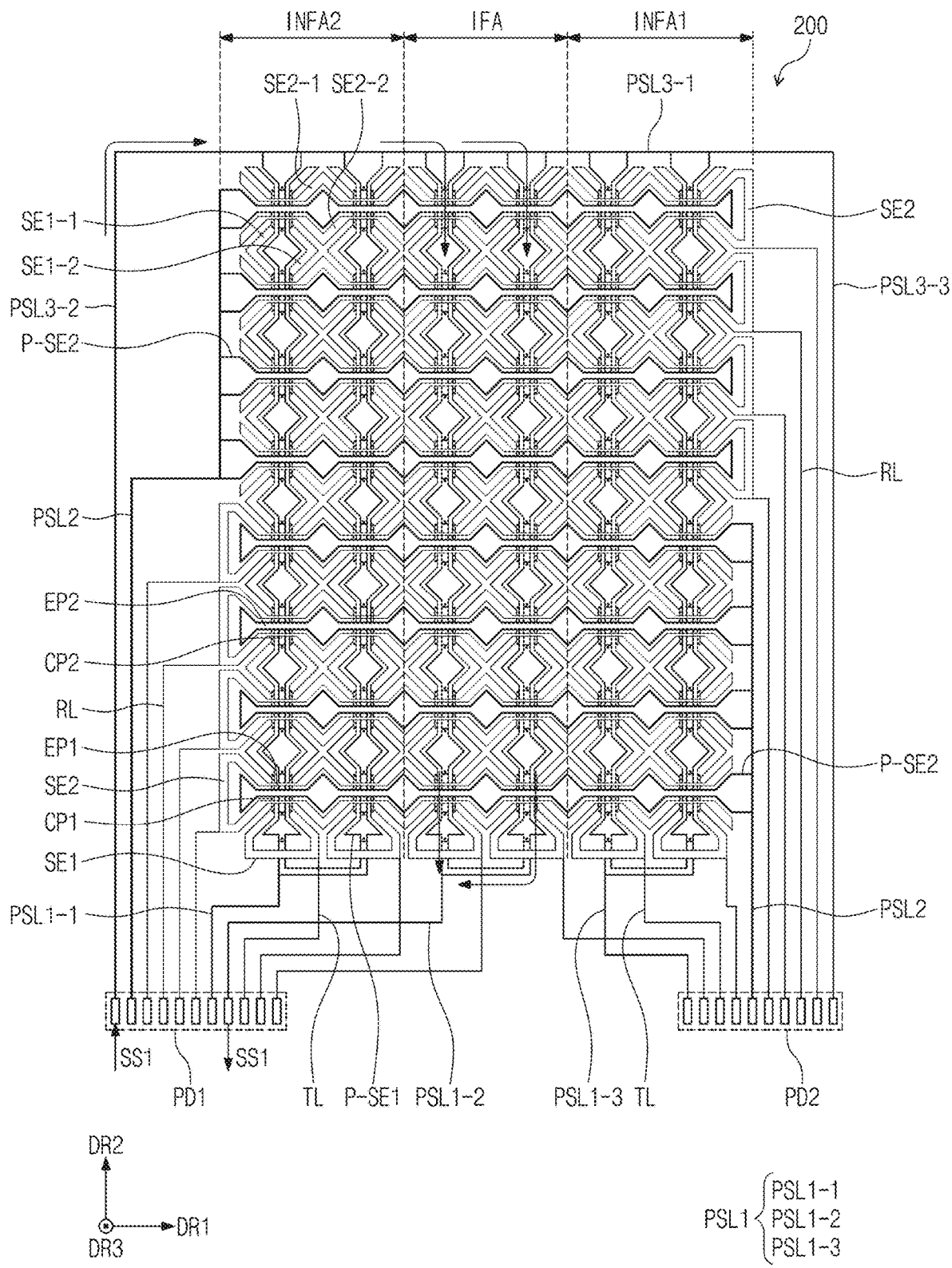
FIGS. 16 to 18 illustrate driving of a pen sensing electrode according to an embodiment of the present disclosure.

When the x-coordinate is not in the foldable area IFA (see FIG. 10), for example, when the x-coordinate is in the non-foldable areas INFA and INFA2 (see FIG. 10), the input device PN can be charged based on the first sensing signal SS1 (see FIG. 16). The charged input device PN generates magnetic flux as it is discharged, and the magnetic flux forms a first induced current IC1 (see FIG. 19) and a second induced current IC2 (see FIG. 19). The sensor driving unit 200C calculates the coordinates of the input device PN based on the first induced current IC1 (see FIG. 19) and the second induced current IC2 (see FIG. 19) (S520).

According to embodiments of the present disclosure, the sensor driving unit 200C transmits to the sensor layer 200 one of the first sensing signal SS1 (see FIG. 16) that has the first driving frequency or the second sensing signal SS2 (see FIG. 17) that has the second driving frequency, according to the position of the input device PN with respect to the display area DA. During the charging period, the capacitor C of the input device PN is charged by the sensing signals SS1 and SS2. Due to the difference between the stacked structures of the lower members, the difference between the signals received from the input device PN can be removed or reduced. A phenomenon in which a picture drawn by the input device PN is bent in the foldable area FA can be prevented. Thus, the electronic device 1000 has increased detection reliability and an interface device that includes the same can be provided.

Figure 17:
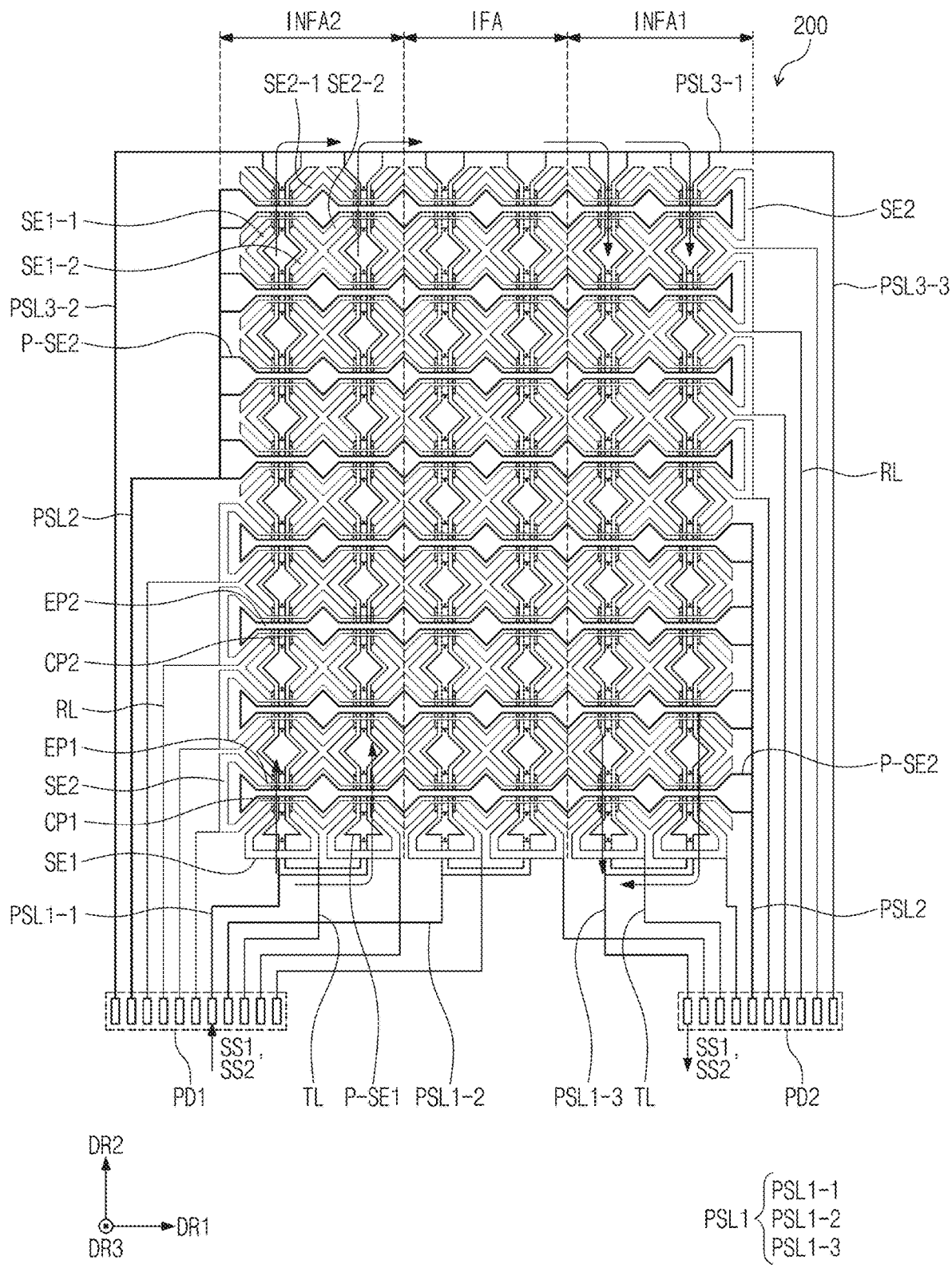
Figure 18:
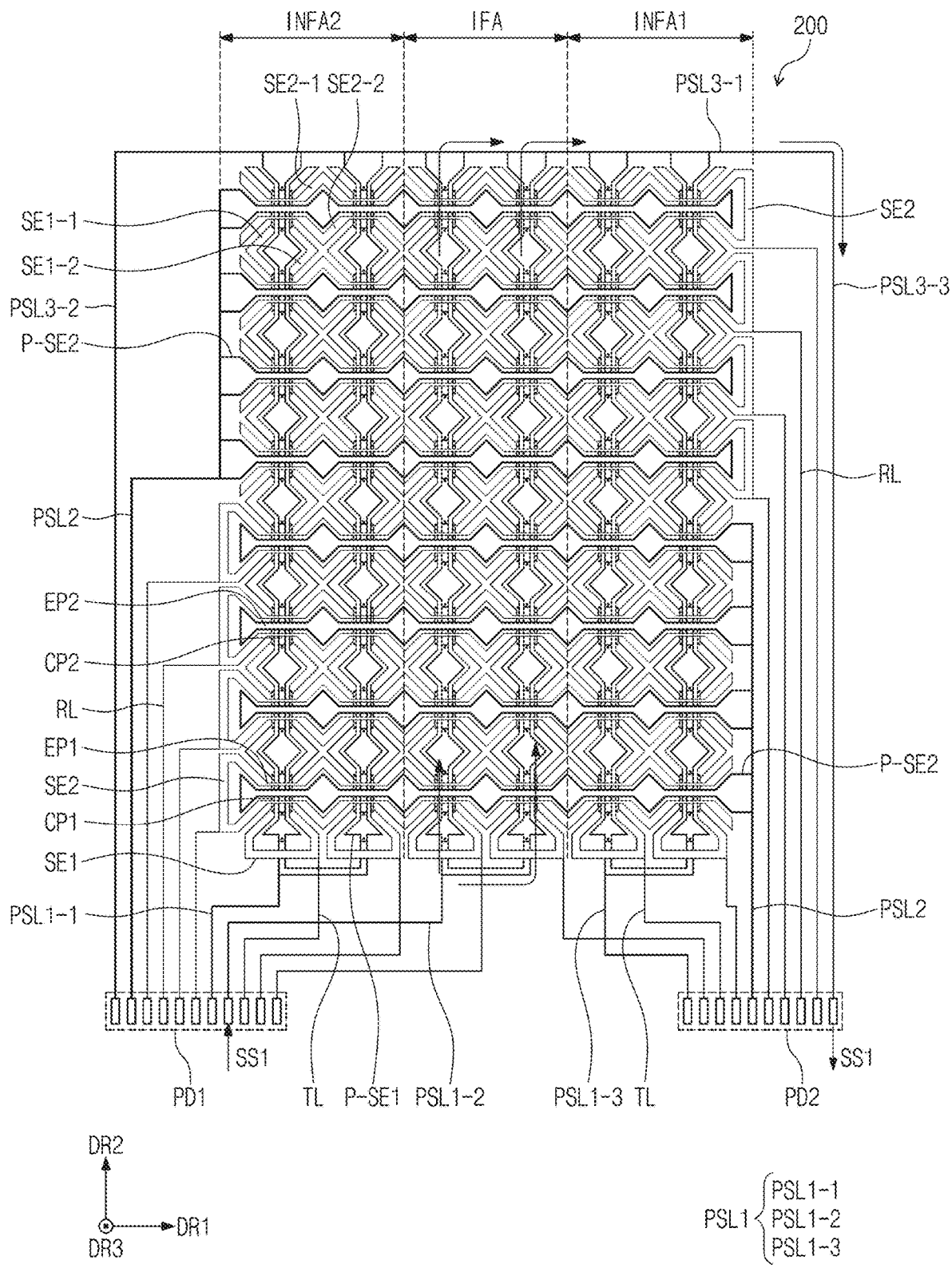

FIGS. 16 to 18 illustrate the driving of a pen sensing electrode according to an embodiment of the present disclosure. In the description of FIGS. 16 to 18, the components described with respect to FIG. 10 are designated by the same reference numerals, and a repeated description thereof will be omitted.

In FIGS. 16 to 18, edges of the active area AA and the non-active area NAA of the sensor layer 200 are omitted for clarity of illustration. FIGS. 16 to 18 show that the first pen sensing wiring lines PSL1 are divided into $(1-1)^{th}$, $(1-2)^{th}$, and $(1-3)^{th}$ pen sensing wiring lines PSL1-1, PSL1-2, and PSL1-3 from a left side to a right side.

Referring to FIGS. 5 and 16, in an embodiment, the second sensing period includes the charging period and a pen sensing period after the charging period. During the charging period, the $(1-1)^{th}$, $(1-2)^{th}$, and $(1-3)^{th}$ pen sensing wiring lines PSL1-1, PSL1-2, and PSL1-3, the first pen sensing electrodes P-SE1, and the $(3-1)^{th}$, $(3-2)^{th}$, and $(3-3)^{th}$ pen sensing wiring lines PSL3-1, PSL3-2, and PSL3-3 are sequentially driven to form a coil.

For example, the first and second pads PD1 and PD2 are connected to the sensor driving unit 200C. The sensor driving unit 200C transmits one of the first sensing signal SS1 that has the first driving frequency or the second sensing signal SS2 (see FIG. 17) that has the second driving frequency different from the first driving frequency to the $(1-1)^{th}$, $(1-2)^{th}$, and $(1-3)^{th}$ pen sensing wiring lines PSL1-1, PSL1-2, and PSL1-3, the first pen sensing electrodes P-SE1, and the $(3-1)^{th}$, $(3-2)^{th}$, and $(3-3)^{th}$ pen sensing wiring lines PSL3-1, PSL3-2, and PSL3-3 in a predetermined order.

During a first period of the charging period, the sensor driving unit 200C is connected to the first pad PD1 to which the $(3-2)^{th}$ pen sensing wiring line PSL3-2 and the $(1-2)^{th}$ pen sensing wiring line PSL1-2 are connected. The sensor driving unit 200C transmits the first sensing signal SS1 to the $(3-2)^{th}$ pen sensing wiring line PSL3-2. The first sensing signal SS1 flows through the $(3-2)^{th}$ pen sensing wiring line PSL3-2, the first pen sensing electrodes P-SE1 connected to the $(1-2)^{th}$ pen sensing wiring line PSL1-2, and the $(1-2)^{th}$ pen sensing wiring line PSL1-2.

Thus, the $(3-2)^{th}$ pen sensing wiring line PSL3-2, the first pen sensing electrodes P-SE1 connected to the $(1-2)^{th}$ pen sensing wiring line PSL1-2, and the $(1-2)^{th}$ pen sensing wiring line PSL1-2 form a coil, and the first sensing signal SS1 flows through the $(3-2)^{th}$ pen sensing wiring line PSL3-2, the first pen sensing electrodes P-SE1 connected to the $(1-2)^{th}$ pen sensing wiring line PSL1-2, and the $(1-2)^{th}$ pen sensing wiring line PSL1-2.

For example, the input device PN is disposed on the sensor layer 200. In the input device PN, the capacitor C ise charged during the charging period.

When the input device PN overlaps the second non-foldable area INFA2, the resonance circuit unit PN100 resonates by the first sensing signal SS1 to charge the capacitor "C". For example, the input device PN is disposed between the $(3-2)^{th}$ pen sensing wiring line PSL3-2 and the first pen sensing electrodes P-SE1 connected to the $(1-2)^{th}$ pen sensing wiring line PSL1-2.

A magnetic flux is generated by the first sensing signal SS1 flowing through the $(3-2)^{th}$ pen sensing wiring line PSL3-2, the first pen sensing electrodes P-SE1 connected to the $(1-2)^{th}$ pen sensing wiring line PSL1-2, and the $(1-2)^{th}$ pen sensing wiring line PSL1-2. The magnetic flux flows into a ferrite core surrounded by the coil of the inductor L, and an induced current is generated in the coil of the inductor L. The capacitor C is charged by the induced current.

Referring to FIGS. 5, 15, and 17, in an embodiment, two or more first pen sensing electrodes P-SE1 spaced apart from each other are electrically connected to each other. The sensor driving unit 200C transmits the first sensing signal SS1 or the second sensing signal SS2 to at least one of the two or more first pen sensing electrodes P-SE1.

During a second period after the first period of the charging period, the sensor driving unit 200C is connected to the first pad PD1 to which the $(1-1)^{th}$ pen sensing wiring line PSL1-1 is connected and the second pad PD2 to which the $(1-3)^{th}$ pen sensing wiring line PSL1-3 is connected. The sensor driving unit 200C transmits the first sensing signal SS1 to the $(1-1)^{th}$ pen sensing wiring line PSL1-1 (S100). The first sensing signal SS1 flows through the $(1-1)^{th}$ pen sensing wiring line PSL1-1, the first pen sensing electrodes P-SE1 connected to the $(1-1)^{th}$ pen sensing wiring line PSL1-1, the first pen sensing electrodes P-SE1 connected to the $(1-3)^{th}$ pen sensing wiring line PSL1-3, and the $(1-3)^{th}$ pen sensing wiring line PSL1-3.

The sensor layer 200 receives the first induced current IC1 (see FIG. 19) from the input device PN (S200). The sensor driving unit 200C calculates the x-coordinate of the input device PN based on the first induced current IC1 (see FIG. 19) (S300).

The sensor driving unit 200C determines whether the x-coordinate is in the foldable area IFA (S400).

When the input device PN does not overlap the foldable area IFA, for example, when the input device PN overlaps the non-foldable areas INFA1 and INFA2, the x-coordinate is in the non-foldable areas INFA1 and INFA2. For example, during the first period or a third period, which will be described below, the magnetic flux generated by the first sensing signal SS1 flows into the ferrite core surrounded by the coil of the inductor L, and in this case, an induced current is generated in the coil of the inductor L. The capacitor C is charged by the induced current.

When the input device PN overlaps the foldable area IFA, the x-coordinate is in the foldable area IFA. For example, the sensor driving unit 200C transmits to the first pen sensing electrode P-SE1 the second sensing signal SS2, which has a driving frequency different from that of the first sensing signal SS1 (S510).

During the second period, the sensor driving unit 200C is connected to the first pad PD1 to which the $(1-1)^{th}$ pen sensing wiring line PSL1-1 is connected and the second pad PD2 to which the $(1-3)^{th}$ pen sensing wiring line PSL1-3 is connected. The sensor driving unit 200C transmits the second sensing signal SS2 to the $(1-1)^{th}$ pen sensing wiring line PSL1-1. The second sensing signal SS2 flows through the $(1-1)^{th}$ pen sensing wiring line PSL1-1, the first pen sensing electrodes P-SE1 connected to the $(1-1)^{th}$ pen sensing wiring line PSL1-1, the first pen sensing electrodes P-SE1 connected to the $(1\text{-}3)^{th}$ pen sensing wiring line PSL1-3, and the $(1\text{-}3)^{th}$ pen sensing wiring line PSL1-3.

Thus, the $(1\text{-}1)^{th}$ pen sensing wiring line PSL1-1, the first pen sensing electrodes P-SE1 connected to the $(1\text{-}1)^{th}$ pen sensing wiring line PSL1-1, the first pen sensing electrodes P-SE1 connected to the $(1\text{-}3)^{th}$ pen sensing wiring line PSL1-3, and the $(1\text{-}3)^{th}$ pen sensing wiring line PSL1-3 form a coil. Further, the second sensing signal SS2 flows through the $(1\text{-}1)^{th}$ pen sensing wiring line PSL1-1, the first pen sensing electrodes P-SE1 connected to the $(1\text{-}1)^{th}$ pen sensing wiring line PSL1-1, the first pen sensing electrodes P-SE1 connected to the $(1\text{-}3)^{th}$ pen sensing wiring line PSL1-3, and the $(1\text{-}3)^{th}$ pen sensing wiring line PSL1-3.

A magnetic flux is generated by the second sensing signal SS2 flowing through the $(1\text{-}1)^{th}$ pen sensing wiring line PSL1-1, the first pen sensing electrodes P-SE1 connected to the $(1\text{-}1)^{th}$ pen sensing wiring line PSL1-1, the first pen sensing electrodes P-SE1 connected to the $(1\text{-}3)^{th}$ pen sensing wiring line PSL1-3, and the $(1\text{-}3)^{th}$ pen sensing wiring line PSL1-3. The magnetic flux flows into the ferrite core surrounded by the coil of the inductor L, and the induced current is generated in the coil of the inductor L. The capacitor C is charged by the induced current.

Unlike an embodiment of the present disclosure, the inductance can change due to the difference between the stacked structures of the lower members of the electronic device. The resonant frequency can change due to the change in inductance. When the input device PN moves from the non-foldable areas NFA1 and NFA2 (see FIG. 1) to the foldable area FA (see FIG. 1), the first induced current IC1 (see FIG. 19) and the second induced current IC2 (see FIG. 19) are changed by the changed resonant frequency, and accordingly, the coordinates of the input device PN might not be accurately measured. However, according to embodiments of the present disclosure, when the input device PN is disposed in the foldable area FA (see FIG. 1), the sensor driving unit 200C transmits the second sensing signal SS2 that has the second driving frequency that corresponds to the resonant frequency changed by the stacked structures. Due to the difference between the stacked structures of the lower members, the difference between the signals received from the input device PN can be removed or reduced. The accuracy of the coordinates measured by the input device PN in the foldable area FA (see FIG. 1) is increased. Thus, the electronic device 1000 has increased detection reliability and an interface device that includes the same can be provided.

However, in the electronic device 1000 according to an embodiment of the present disclosure, the sensor driving unit 200C may transmit only the second sensing signal SS2 to the first pen sensing electrode P-SE1 to form the magnetic flux in the foldable area IFA and transmit only the first sensing signal SS1 to the first pen sensing electrode P-SE1 to form the magnetic flux in the non-foldable areas INFA1 and INFA2.

Referring to FIGS. 5 and 18, during a third period after the second period of the charging period, the sensor driving unit 200C is connected to the first pad PD1 to which the $(1\text{-}2)^{th}$ pen sensing wiring line PSL1-2 is connected and the second pad PD2 to which the $(3\text{-}3)^{th}$ pen sensing wiring line PSL3-3 is connected. The sensor driving unit 200C transmits the first sensing signal SS1 to the $(1\text{-}2)^{th}$ pen sensing wiring line PSL1-2. The first sensing signal SS1 flows through the $(1\text{-}2)^{th}$ pen sensing wiring line PSL1-2, the first pen sensing electrodes P-SE1 connected to the $(1\text{-}2)^{th}$ pen sensing wiring line PSL1-2, and the $(3\text{-}3)^{th}$ pen sensing wiring line PSL3-3.

Thus, the $(1\text{-}2)^{th}$ pen sensing wiring line PSL1-2, the first pen sensing electrodes P-SE1 connected to the $(1\text{-}2)^{th}$ pen sensing wiring line PSL1-2, and the $(3\text{-}3)^{th}$ pen sensing wiring line PSL3-3 form a coil, and the first sensing signal SS1 flows through the $(1\text{-}2)^{th}$ pen sensing wiring line PSL1-2, the first pen sensing electrodes P-SE1 connected to the $(1\text{-}2)^{th}$ pen sensing wiring line PSL1-2, and the $(3\text{-}3)^{th}$ pen sensing wiring line PSL3-3.

When the input device PN overlaps the first non-foldable area INFA1, the resonance circuit unit PN100 resonates by the first sensing signal SS1 to charge the capacitor C. For example, the input device PN is disposed between the $(3\text{-}3)^{th}$ pen sensing wiring line PSL3-3 and the first pen sensing electrodes P-SE1 connected to the $(1\text{-}2)^{th}$ pen sensing wiring line PSL1-2.

A magnetic flux is generated by the first sensing signal SS1 flowing through the $(1\text{-}2)^{th}$ pen sensing wiring line PSL1-2, the first pen sensing electrodes P-SE1 connected to the $(1\text{-}2)^{th}$ pen sensing wiring line PSL1-2, and the $(3\text{-}3)^{th}$ pen sensing wiring line PSL3-3. The magnetic flux flows into the ferrite core surrounded by the coil of the inductor L, and the induced current is generated in the coil of the inductor L. The capacitor C is charged by the induced current.

Figure 19:
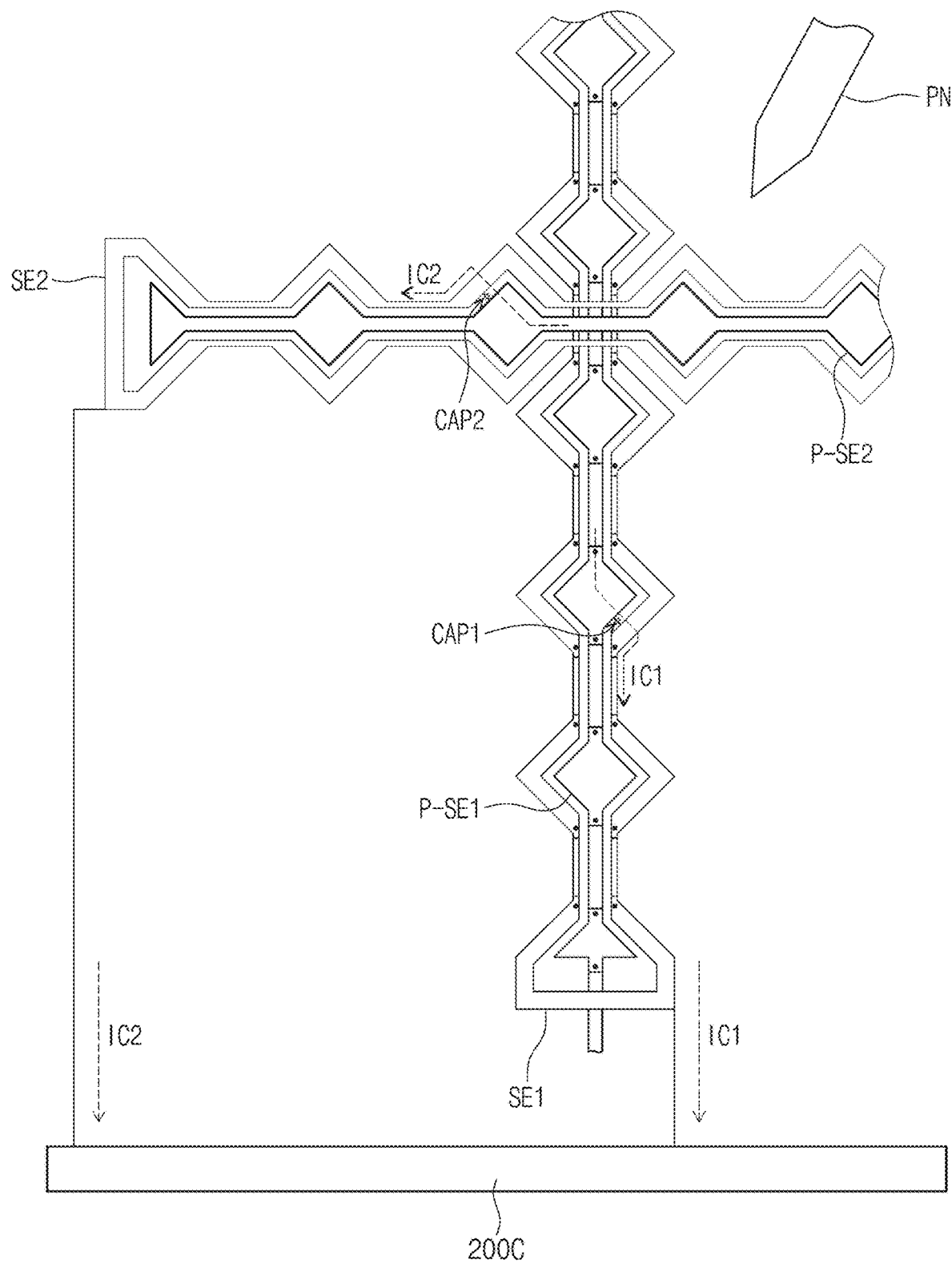
FIG. 19 illustrates a sensing operation for a touch of the input device.

FIG. 19 illustrates a sensing operation of a touch of the input device.

For convenience of description, FIG. 19 illustrates one first pen sensing electrode P-SE1 and one second pen sensing electrode P-SE2 through which the induced current generated by the input device PN flows. Further, the first sensing electrode SE1 adjacent to the first pen sensing electrode P-SE1 and the second sensing electrode SE2 adjacent to the second pen sensing electrode P-SE2 are illustrated together with the first pen sensing electrode P-SE1 and the second pen sensing electrode P-SE2.

Referring to FIGS. 5, 15, and 19, in an embodiment, during the pen sensing period after the charging period, the sensor driving unit 200C is electrically connected to the first and second sensing electrodes SE1 and SE2. During the pen sensing period, the first sensing signal SS1 and the second sensing signal SS2 are not transmitted to the $(1\text{-}1)^{th}$, $(1\text{-}2)^{th}$, and $(1\text{-}3)^{th}$ pen sensing wiring lines PSL1-1, PSL1-2, and PSL1-3, the first pen sensing electrodes P-SE1, and the $(3\text{-}1)^{th}$, $(3\text{-}2)^{th}$, and $(3\text{-}3)^{th}$ pen sensing wiring lines PSL3-1, PSL3-2, and PSL3-3.

The first pen sensing electrode P-SE1 and the second pen sensing electrode P-SE2 communicate with the input device PN. The resonance circuit unit PN100 of the input device PN generates a magnetic flux while consuming charge. An induced current is generated in the first pen sensing electrode P-SE1 and the second pen sensing electrode P-SE2 due to the magnetic flux.

The first induced current IC1 generated in the first pen sensing electrode P-SE1is transmitted to the first sensing electrode SE1 by a first capacitor CAP1 formed by the first sensing electrode SE1 and the first pen sensing electrode P-SE1 and is transmitted to the sensor driving unit 200C. The sensor driving unit 200C calculates the x-coordinate based on the first induced current IC1. The second induced current IC2 generated in the second pen sensing electrode P-SE2 is transmitted to the second sensing electrode SE2 by a second capacitor CAP2 formed by the second sensing electrode SE2 and the second pen sensing electrode P-SE2 and is transmitted to the sensor driving unit 200C. The sensor driving unit 200C calculates the y-coordinate based on the second induced current IC2.

The sensor driving unit 200C calculates the coordinates of the input device PN by sensing the first induced current IC1 and the second induced current IC2 received through the first and second sensing electrodes SE1 and SE2 (S520). For example, the touch of the input device PN is sensed by the first and second pen sensing electrodes P-SE1 and P-SE2 and the first and second sensing electrodes SE1 and SE2.

According to the above description, a sensor driving unit transmits to a sensor layer one of a first sensing signal that has a first driving frequency or a second sensing signal that has a second driving frequency that differs from the first driving frequency, according to a position of an input device with respect to a display area. Due to differences between stacked structures of lower members, a difference between signals received from the input device can be removed or reduced. A phenomenon in which a picture drawn by the input device is bent in a foldable area can be prevented. Thus, an electronic device can be provided that has increased detection reliability and an interface device that includes the same.

Although a description has been provided above with reference to embodiments of the present disclosure, it may be understood that those skilled in the art or those having ordinary knowledge in the art can variously modify and change embodiments of the present disclosure without departing from the spirit and technical scope of embodiments of the present disclosure as claimed in the appended claims. Accordingly, the technical scope of embodiments of the present disclosure is not limited to the detailed description, but should be defined by the appended claims.

What is claimed is:

1. An interface device, comprising:
an electronic device; and
an input device that communicates with the electronic device,
wherein the electronic device includes:
  a display layer that includes a display area that includes a foldable area and a plurality of non-foldable areas spaced apart from each other with the foldable area interposed therebetween;
  a sensor layer disposed on the display layer and that includes a plurality of detection electrodes; and
  a sensor driving unit that drives the sensor layer,
wherein the plurality of detection electrodes include:
  a first sensing electrode;
  a second sensing electrode that is insulated from and crosses the first sensing electrode;
  a first pen sensing electrode that is adjacent to the first sensing electrode and is insulated from and crosses the second sensing electrode; and
  a second pen sensing electrode that is adjacent to the second sensing electrode and is insulated from and crosses the first sensing electrode and the first pen sensing electrode, and
  wherein the sensor driving unit transmits to the first pen sensing electrode one of a first sensing signal that has a first driving frequency or a second sensing signal that has a second driving frequency that differs from the first driving frequency according to a position of the input device with respect to the display area.

2. The interface device of claim 1, wherein the sensor driving unit
transmits the first sensing signal to the first pen sensing electrode; and
transmits the second sensing signal to the first pen sensing electrode when the input device overlaps the foldable area.

3. The interface device of claim 1, wherein the electronic device further includes a plurality of lower members that are disposed under the display layer and that overlap the plurality of non-foldable areas.

4. The interface device of claim 3, wherein, when viewed in a plan view, the plurality of lower members do not overlap at least a portion of the foldable area.

5. The interface device of claim 3, wherein the plurality of lower members include a conductive shielding layer.

6. The interface device of claim 3, wherein the electronic device further includes a first bracket disposed under the plurality of lower members, and
when viewed in a plan view, the first bracket overlaps the foldable area and the plurality of non-foldable areas.

7. The interface device of claim 3, wherein the electronic device further includes a plurality of second brackets disposed under the plurality of lower members, and
a first separation distance between the plurality of lower members is less than a second separation distance between the plurality of second brackets.

8. The interface device of claim 1, wherein the first driving frequency is higher than the second driving frequency.

9. The interface device of claim 1, wherein the first pen sensing electrode includes a plurality of first pen sensing electrodes, and
two first pen sensing electrodes spaced apart from each other are electrically connected to each other.

10. The interface device of claim 9, wherein the sensor driving unit transmits one of the first sensing signal or the second sensing signal to one of the two first pen sensing electrodes.

11. The interface device of claim 1, wherein the first pen sensing electrode and the second pen sensing electrode communicate with the input device.

12. The interface device of claim 1, wherein the input device includes an electromagnetic resonance pen.

13. The interface device of claim 12, wherein the input device includes an inductor and a capacitor.

14. The interface device of claim 1, wherein the foldable area is spaced apart from the plurality of non-foldable areas in a first direction, and
the first pen sensing electrode extends in a second direction that crosses the first direction.

15. An electronic device, comprising:
a display layer that includes a first area and a second area adjacent to the first area;
a sensor layer disposed on the display layer and that includes a plurality of detection electrodes; and
a sensor driving unit that drives the sensor layer,
wherein the plurality of detection electrodes include:
  a plurality of first sensing electrodes;
  a plurality of second sensing electrodes that are insulated from and cross the plurality of first sensing electrodes;
  a plurality of first pen sensing electrodes that are adjacent to the plurality of first sensing electrodes, and are insulated from and cross the plurality of second sensing electrodes; and
  a plurality of second pen sensing electrodes that are adjacent to the plurality of second sensing electrodes, and are insulated from and cross the plurality of first sensing electrodes and the plurality of first pen sensing electrodes, and
  the sensor driving unit that transmits a first sensing signal that has a first driving frequency to a first pen sensing electrode such that a magnetic flux is formed in the first area and transmits a second sensing signal that has a second driving frequency that differs from the first driving frequency to a first pen sensing electrode such that a magnetic flux is formed in the second area.

16. The electronic device of claim 15, further comprising: a plurality of lower members disposed under the display layer and that overlap the second area.

17. The electronic device of claim 16, wherein, when viewed in a plan view, the plurality of lower members do not overlap at least a portion of the first area.

18. The electronic device of claim 16, wherein the plurality of lower members include a conductive shielding layer.

19. The electronic device of claim 16, wherein the electronic device further includes a first bracket disposed under the plurality of lower members, and
when viewed in a plan view, the first bracket overlaps the first area and the second area.

20. The electronic device of claim 16, wherein the electronic device further includes a plurality of second brackets disposed under the plurality of lower members, and
a first separation distance between the plurality of lower members is less than a second separation distance between the plurality of second brackets.

21. The electronic device of claim 15, wherein the first driving frequency is higher than the second driving frequency.

22. The electronic device of claim 15, wherein the plurality of first pen sensing electrodes and the plurality of second pen sensing electrodes communicate with an external input device.

23. The electronic device of claim 15, wherein the first area is spaced apart from the second area in a first direction, and
each of the plurality of first pen sensing electrodes extends in a second direction that intersects the first direction.

24. The electronic device of claim 15, wherein two first pen sensing electrodes spaced apart from each other are electrically connected to each other.

25. The electronic device of claim 24, wherein the sensor driving unit transmits the first sensing signal or the second sensing signal to one of the two first pen sensing electrodes.

* * * * *